United States Patent
Benson et al.

(10) Patent No.: US 7,767,128 B2
(45) Date of Patent: Aug. 3, 2010

(54) APPARATUS AND METHODS FOR FORMING COMPOSITE STIFFENERS AND REINFORCING STRUCTURES

(75) Inventors: Vernon M. Benson, Morgan, UT (US); Jason K. Slack, Clinton, UT (US); Todd A. Rosevear, Taylorsville, UT (US); James L. Harvey, Salt Lake City, UT (US); Mark Roman, Salt Lake City, UT (US); Timothy Olschewski, Kearns, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 12/323,403

(22) Filed: Nov. 25, 2008

(65) Prior Publication Data
US 2009/0071597 A1    Mar. 19, 2009

Related U.S. Application Data

(63) Continuation of application No. 10/903,871, filed on Jul. 30, 2004, now Pat. No. 7,513,769, which is a continuation-in-part of application No. 10/633,025, filed on Aug. 1, 2003, now Pat. No. 7,249,943.

(51) Int. Cl.
*B29C 70/44* (2006.01)
(52) U.S. Cl. .................. 264/258; 264/263; 156/163
(58) Field of Classification Search .............. 264/258, 264/263; 156/163
See application file for complete search history.

(56) References Cited

U.S. PATENT DOCUMENTS

| | | | |
|---|---|---|---|
| 1,669,324 A | | 4/1923 | Johnston |
| 2,938,566 A | * | 5/1960 | Toulmin, Jr. ............... 156/431 |
| 2,979,431 A | | 4/1961 | Perrault |
| 3,616,072 A | * | 10/1971 | Bostrom ................... 156/468 |
| 3,669,324 A | | 6/1972 | Landoni |
| 3,995,080 A | | 11/1976 | Cogburn et al. |
| 3,995,081 A | | 11/1976 | Fant et al. |
| 4,475,976 A | * | 10/1984 | Mittelstadt et al. ......... 156/286 |

(Continued)

FOREIGN PATENT DOCUMENTS

FR    1554899    1/1969

(Continued)

OTHER PUBLICATIONS

PCT International Search Report, dated Dec. 13, 2004.

(Continued)

*Primary Examiner*—Joseph S Del Sole
*Assistant Examiner*—David N Brown, II
(74) *Attorney, Agent, or Firm*—IPLM Group, P.A.

(57) ABSTRACT

Method of forming a curved composite structure are provided. In one embodiment, the method includes contacting at least one ply of preimpregnated material on a first surface of a curved mandrel. The first surface of the mandrel has a first radius of curvature. The mandrel further has at least one second surface that has a second radius of curvature. A tension gradient is introduced on the ply adjacent to the first radius of curvature and the ply is then pressed over the curved mandrel to form the curved composite structure.

13 Claims, 25 Drawing Sheets

U.S. PATENT DOCUMENTS

| | | | |
|---|---|---|---|
| 4,548,859 A * | 10/1985 | Kline et al. | 442/312 |
| 4,559,005 A | 12/1985 | Gants et al. | |
| 4,861,406 A * | 8/1989 | Baker et al. | 156/230 |
| 4,946,526 A | 8/1990 | Petty-Galis et al. | |
| 4,997,510 A | 3/1991 | Shinno et al. | |
| 5,026,447 A | 6/1991 | O-Connor | |
| 5,039,371 A * | 8/1991 | Cremens et al. | 156/382 |
| 5,043,128 A | 8/1991 | Umeda | |
| 5,076,873 A | 12/1991 | Lowery | |
| 5,137,071 A | 8/1992 | Ashton et al. | |
| 5,151,236 A | 9/1992 | Azzara et al. | |
| 5,182,060 A | 1/1993 | Berecz | |
| 5,211,901 A | 5/1993 | Fray | |
| 5,292,475 A | 3/1994 | Mead et al. | |
| 5,451,377 A | 9/1995 | Asher et al. | |
| 5,484,277 A | 1/1996 | Lindsay | |
| 5,502,886 A | 4/1996 | Jensen et al. | |
| 5,538,589 A | 7/1996 | Jensen et al. | |
| 5,543,199 A | 8/1996 | Fell | |
| 5,639,410 A | 6/1997 | Amaike et al. | |
| 5,681,513 A | 10/1997 | Farley | |
| 5,707,576 A * | 1/1998 | Asher | 264/258 |
| 5,738,749 A | 4/1998 | Grimshaw et al. | |
| 5,792,487 A | 8/1998 | Wenning et al. | |
| 5,820,804 A * | 10/1998 | Elmaleh | 264/167 |
| 5,882,462 A | 3/1999 | Donecker et al. | |
| 5,891,379 A | 4/1999 | Bhattacharyya et al. | |
| 5,954,917 A | 9/1999 | Jackson et al. | |
| 6,071,458 A | 6/2000 | Mossi | |
| 6,355,133 B1 | 3/2002 | Williams | |
| 6,432,236 B1 | 8/2002 | Leemon et al. | |
| 7,249,943 B2 | 7/2007 | Benson et al. | |
| 7,513,769 B2 | 4/2009 | Benson et al. | |
| 2001/0001409 A1 | 5/2001 | Weight et al. | |
| 2002/0144401 A1 | 10/2002 | Nogueroles Vines et al. | |
| 2003/0079825 A1 | 5/2003 | Gardner et al. | |
| 2003/0186763 A1 * | 10/2003 | Eggiman et al. | 473/564 |
| 2009/0071592 A1 * | 3/2009 | Benson et al. | 156/163 |
| 2009/0081443 A1 | 3/2009 | Benson et al. | |

FOREIGN PATENT DOCUMENTS

| | | |
|---|---|---|
| JP | U-58-39845 | 9/1981 |
| JP | 62-119027 | 5/1987 |
| JP | 04-062142 | 2/1992 |
| JP | 05-050571 | 3/1993 |
| WO | WO 99/52698 | 10/1999 |
| WO | WO 00/37244 | 6/2000 |

OTHER PUBLICATIONS

Composite Systems, Inc., PFE_Technology, http://www.compositemfg.com/FRE%20Technology.htm, 2003, 2 pages.

Office action for U.S. Appl. No. 12/323,382 mailed Dec. 23, 2009.

Notice of Reason for Rejection. Japanese Office Action for Japanese Patent Application 2006-522662, mailed Jul. 16, 2009.

* cited by examiner

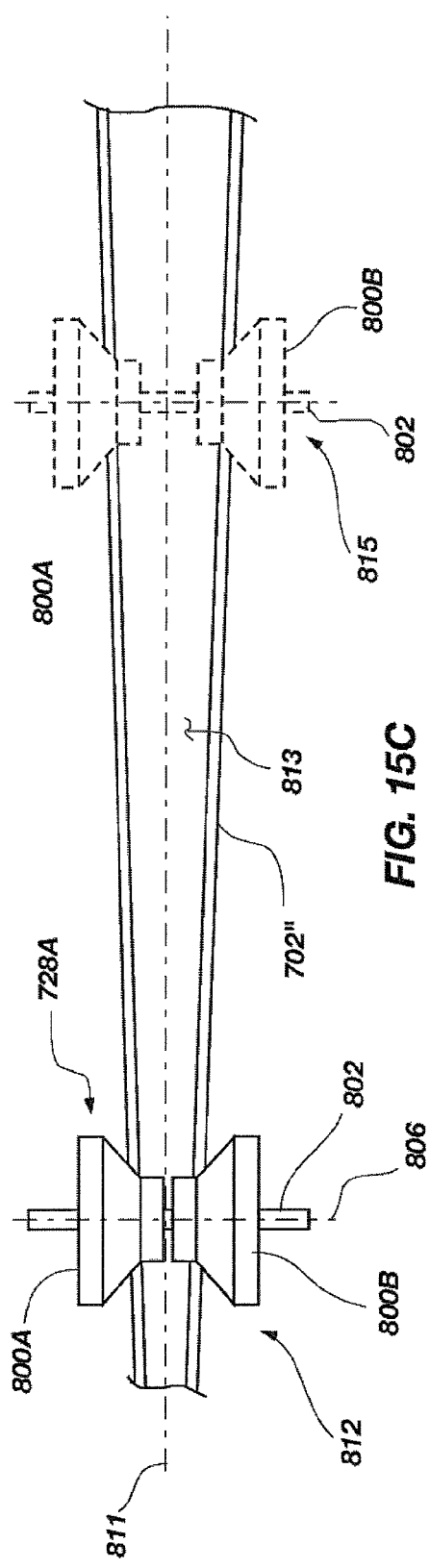
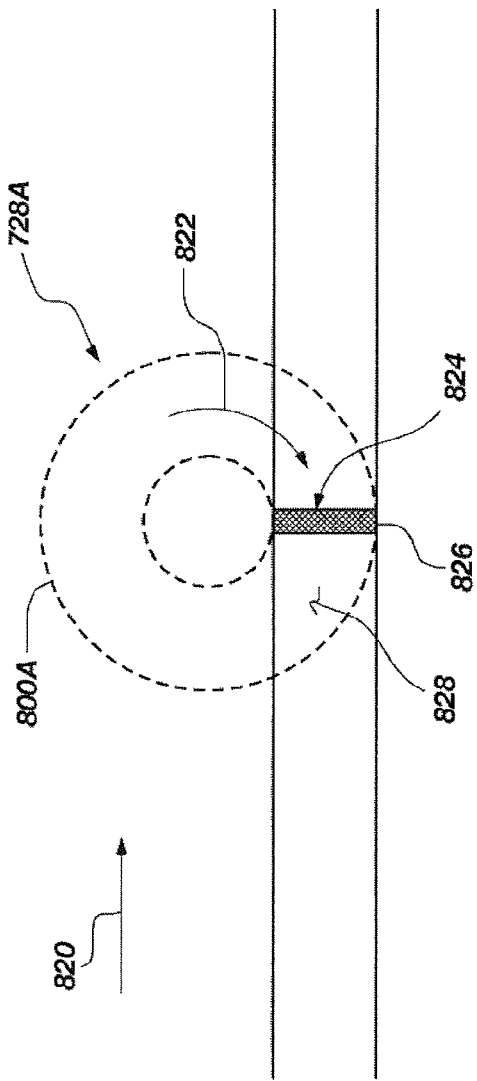
FIG. 15C
FIG. 15D

APPARATUS AND METHODS FOR FORMING COMPOSITE STIFFENERS AND REINFORCING STRUCTURES

CROSS-REFERENCE TO RELATED APPLICATIONS

This application is a continuation of U.S. Ser. No. 10/903,871 filed Jul. 30, 2004 now U.S. Pat. No. 7,513,769 ('769 Patent) issued Apr. 7, 2009. The '769 patent is a continuation-in-part of U.S. Pat. No. 7,249,943 ('943 Patent), filed Aug. 1, 2003. Both the '769 Patent and the '943 Patent are assigned to the Assignee hereof, the disclosure of both are incorporated by reference herein in their entirety.

BACKGROUND OF THE INVENTION

1. Field of the Invention

The present invention relates generally to the formation of composite structures and, more particularly, to the formation of the stiffeners or other reinforcing members associated with such composite structures including reinforcing members exhibiting arcuate or curved elongated geometries.

2. State of the Art

In the fabrication of composite structures, structural members are often attached to a skin to provide reinforcement of the skin. Such structural members may include, for example, ribs, spars or frames configured to be attached to the skin of the composite structures. Such structural members may also include substantially elongated stiffening members often referred to as stringers or stiffeners. The stringers or stiffeners may be formed to exhibit various cross-sectional geometries including configurations such as I-beams, C-shapes (sometimes referred to as U-shapes or channels), J-shapes, Z-shapes, L-shapes or angles, omega shapes or what is often referred to as a hat shape or a hat channel. A stiffener or stringer exhibiting a cross-sectional geometry or profile of a hat essentially includes a cap member having a pair of web members, one web member extending from each end of the cap member at a defined angle relative thereto, and a pair of flange members with one flange member extending from each web member at a defined angle relative to the associated web member. In the cross-sectional geometry of some hat stiffeners, the flange members may be configured to be substantially parallel with the cap member.

A current method of forming composite hat stiffeners, as well as stiffeners exhibiting other cross-sectional geometries, includes laying up composite plies by hand, one at a time, over a mold, mandrel or other similar tool to form a laminate structure. Upon laying up every two to three plies, the laminate structure needs to be compacted or debulked. This is conventionally accomplished by vacuum debulking wherein a vacuum bag is placed over the laminate structure and a vacuum applied to the structure by way of the bag. Often, heat may be applied to assist in the debulking process and in an attempt to further compact the laminate structure. Each vacuum debulk performed on the laminate structure represents a time consuming process. In forming the laminate structure, multiple vacuum compactions may need to take place upon the building up of layers to form the laminate structure. However, even with multiple vacuum debulks being performed on a given laminate structure, the laminate structure may still undesirably exhibit a significant amount of bulk.

Once all of the plies have been positioned and the laminate structure has been initially formed (including the process of subjecting the laminate structure to vacuum debulking processes), the laminate structure may be cured and subsequently attached to a skin structure, such as with adhesive, or it may be cocured (cured concurrently) with the skin structure thereby bonding the two components together. Curing of the laminate structure is conventionally accomplished by placing the laminate structure in a cure mold and subjecting it to a high pressure and high temperature such as in an autoclave or similar environment.

When the laminate structures are placed in a cure mold, because they still exhibit a substantial amount of bulk, they sometimes do not fit properly within the mold. Furthermore, while any remaining bulk exhibited by the laminate structure tends to be driven out during the curing process, such as in an autoclave, there is little, if any, slip allowed between the plies of the laminate structure and, as a result, ply bridging and ply wrinkling will often occur within the cured or partially cured laminate structure.

While it is possible to obtain structures with low bulk characteristics by subjecting the structures to multiple hot debulks under autoclave pressure, such is a very time consuming and expensive process. Additionally, such a process may shorten the working life of the laminate structure due to the repeated subjection thereof to high temperatures. Furthermore, such an aging process can hinder the ability of the laminate structure to be cocured with a mating skin or other structure.

In addition to the issues of obtaining a low bulk structure, the conventional process of forming composite reinforcing structures by hand has other limitations. For example, the method of forming elongated reinforcing structures by hand poses difficulties in obtaining shapes which, besides exhibiting a desired cross-sectional geometry, also exhibit bends along a longitudinal axis or twist about the longitudinal axis of the structure. Such features are difficult to accomplish, in part, because it is difficult to manipulate the plies by hand to conform to such bends and/or twists without introducing additional wrinkles or waves into the laminate structure being formed. Furthermore, the manipulation of plies by hand is an extremely time consuming and labor intensive process, thereby increasing the cost of manufacturing such parts.

Various attempts have been made to provide a process which provides elongated reinforcing structures without the various limitations which are presented by the conventional process of laying up individual composite plies by hand. For example, pultrusion is a process which has been used to form plastic materials, including fiber reinforced plastic composite materials, into structures exhibiting a desired cross-sectional geometry or profile. An example of such a pultrusion process is set forth in U.S. Pat. No. 5,026,447 issued to O'Connor. O'Connor teaches the pulling of an elongated body of reinforced thermoplastic material through a plurality of dies. The dies are operated independently of each other such that any combination of the dies may be selected to impart a cross-sectional geometry to a portion of the elongated body. The process of O'Connor purportedly allows the manufacture of an elongated thermoplastic member which may exhibit varied cross-sectional geometries along the length thereof. However, as will be recognized by those of ordinary skill in the art, there are various limitations associated with the process of pultrusion.

For example, pultrusion is conventionally associated with materials utilizing a thermoplastic resin. The use of thermosetting resins may cause a build up of material on the dies and cause considerable inefficiencies in forming the desired cross-sectional shape of the pultruded member. Additionally, it is often difficult to obtain a fiber orientation in the resultant member which varies significantly from the longitudinal axis of the formed member (i.e., along the direction which the member is pulled through the die or dies). Furthermore, because the process involves forming the member by pulling a plurality of fibers through a die and then cooling the member until the resin substantially resolidifies, such a process is generally only effective for forming straight or linear members of substantially constant cross sections and may not be effective in forming members exhibiting a substantial change in cross-sectional area or which exhibits substantial non-linear sections along the length thereof. It is also noted that the dies used in pultrusion are generally expensive to manufacture and that numerous dies are required if it is desired to produce elongated members of more than one cross-sectional geometry.

Other processes for forming elongated thermoplastic members include, for example, U.S. Pat. No. 5,891,379 issued to Bhattacharyya et al., and U.S. Pat. No. 5,182,060 issued to Berecz. Bhattacharyya discloses a process of forming fiber reinforced plastic material into a desired shape which includes heating the material to a temperature above the melting temperature of the thermoplastic resin or matrix material. The heated material is cooled below the melting temperature but still maintained at a temperature which is above the recrystallization temperature of the thermoplastic material, and then passed through a plurality of roll-forming dies in order to produce a desired shape. The shaped material is then further cooled so that the fiber reinforced plastic material will retain the shape imposed thereto by roll-forming dies. Berecz discloses a process of continuously forming a thermoplastic composite shape including the heating of unidirectional tape or woven cloth, passing the heated material through a set of rollers, and then through a matched metal die which acts as a rapidly reciprocating punch to form the final shape.

While the processes taught by Bhattacharyya and Berecz appear to allow improved control of the fiber orientation in the resultant part over a conventional pultrusion process, the disclosed processes appear to be limited to the use of materials comprising thermoplastic resins including subjecting the materials to temperatures at or above melting temperatures of the resin prior to forming the desired cross-sectional geometries. As will be appreciated by those of ordinary skill in the art, the use of thermoplastic resins provide considerable flexibility in being able to melt, or substantially melt, the resin and subsequently reheat the resin in order to reshape/rework the member and/or to adhere the member to another structure by means of contacting the other structure with the melted or substantially melted resin material.

However, such a process is not amenable to the formation of reinforcing or structural members comprising thermosetting materials since, if the thermosetting resin is heated above a specified temperature to allow the resin to readily flow and thereby assist in forming the composite material into a specified cross-sectional geometry, the thermosetting resin will crosslink and cure. Once the reinforcing member is cured, it will not be possible to perform any subsequent rework of the member. Nor will the member be able to be bonded to another structure through cocuring.

For example, U.S. Pat. No. 5,043,128 to Umeda discloses a process of forming an elongated composite member utilizing a thermosetting resin which includes feeding a plurality of preimpregnated carbon fiber sheets of material through a pair of shaping rollers and into a heating and press forming device. The heating and press forming device includes a heating die and a press punch configured to engage the heating die. The sheets of material are temporarily stopped within the heating and press forming device and pressed by the punch against the heating die. The sheets of material are, thus, simultaneously pressed and heated resulting in the thermosetting, or curing, the sheets of material into the desired shape. As noted above, a process of forming a structural member which includes the curing of a thermosetting resin prevents any subsequent reworking of the member and/or any cocuring of the structural member with, for example, a composite skin or other structural member. Thus, in order to form a structural member exhibiting a desired cross-sectional geometry from a composite material comprising a thermosetting resin which is not fully cured, methods such as that described above wherein multiple plies are laid up by hand over a mandrel or mold are still utilized.

In view of the shortcomings in the art, it would be advantageous to provide an apparatus and a method for forming elongated reinforcing or structural members of a material comprising a thermosetting resin which enables the member to exhibit a desired cross-sectional geometry without fully curing the member.

BRIEF SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment a method of forming a curved composite structure is provided. The method includes contacting at least one ply of preimpregnated material on a first surface of a curved mandrel. The first surface of the mandrel has a first radius of curvature. The mandrel further has at least one second surface that has a second radius of curvature. A tension gradient is introduced on the ply adjacent to the first radius of curvature and the ply is then pressed over the curved mandrel to form the curved composite structure.

BRIEF DESCRIPTION OF THE SEVERAL VIEWS OF THE DRAWINGS

The foregoing and other advantages of the invention will become apparent upon reading the following detailed description and upon reference to the drawings in which:

FIGS. 15B-15D show details on various components of the apparatus shown in FIGS. 14A, 14B and 15A;

DETAILED DESCRIPTION OF THE INVENTION

Figure 1:
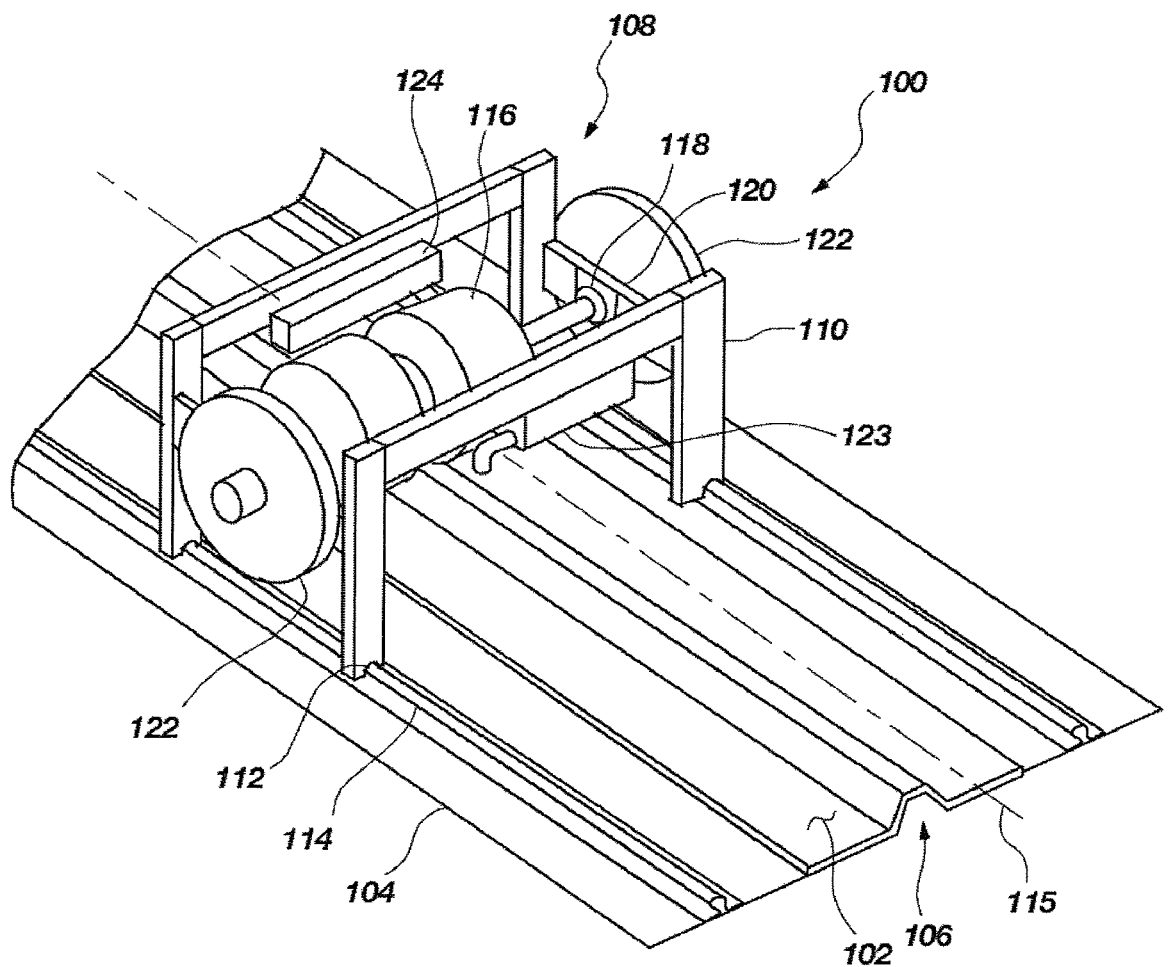
FIG. 1 is a perspective view of an apparatus for forming elongated composite members in accordance with an embodiment of the invention.

Referring to FIG. 1, an apparatus 100 is shown for forming elongated structural or reinforcing members 102 (referred to herein for simplicity as elongated members), such as stiffeners or stringers, using composite materials including, for example, carbon fiber reinforced materials and thermosetting resins. The apparatus includes a base 104 having a portion thereof configured as a molding member such as a mandrel 106. A carriage assembly 108, including a frame 110, is movably coupled with the base 104 such as, for example, with rollers or slides 112 positioned within corresponding track members 114. The rollers or slides 112 in conjunction with the track members 114 allow the carriage assembly 108 to move along a longitudinally defined axis 115 relative to the base 104 in forming the elongated member 102 as shall be described in greater detail below herein.

The carriage assembly 108 further includes a rolling member 116, also referred to herein as a roller, configured to be at least partially complementary with, and positioned over, the mandrel 106. The roller 116 may be removably coupled with the carriage assembly 108 such that other rollers may be interchanged therewith at various stages of forming the elongated member 102 or for forming elongated members with differing cross-sectional geometries. The roller 116 may be coupled to the carriage assembly 108 by way of a suitable bearing member 118 allowing the roller 116 to turn or roll when engaged with the base 104 and when the carriage assembly 108 is moving relative thereto. The roller 116 may be formed of, or coated with, for example, an elastomer material, such as, for example, polytetrafluorethylene (PTFE), for purposes of conforming the roller to the surface of, and more evenly distributing forces over, the laminate materials disposed over the mandrel 106 and which are being used to form the elongated member 102 as the roller 116 passes thereover.

The frame 110 of the carriage assembly 108 may desirably be configured such that the roller 116 is substantially vertically displaceable or adjustable relative to the base 104. For example, a portion of the frame 110, such as a cross-member 120, may be vertically displaceable relative to the main portion of the frame 110. The carriage assembly 108 is also configured to exert a generally downward force on the base 104 and, thus, the elongated member 102, by way of the roller 116. Various mechanisms may be used to exert such a force. For example, as illustrated in FIG. 1, one or more weights 122 may be coupled to the carriage assembly 108 and, more particularly, to the cross-member 120 such that the weights exert a downward force through the roller 116 which is coupled with such cross-members 120. In another embodiment, an actuator, such as a hydraulic or pneumatic cylinder, may be coupled to the frame 110 and configured to exert a substantially downward force upon the cross-member 120 or some other component such that a pressure may be applied by the roller 116 to the mandrel 106.

The carriage assembly 108 may also include a heating apparatus 123 configured to heat a portion of the elongated member 102 prior to the roller 116 passing thereover. The heating apparatus or device 123 may include, for example, a resistive heater with an associated blower, an infrared heater, an ultrasonic heating device, a laser heating device, an electron beam heater or another appropriate heating device. In one embodiment, the heating device 123 may be configured and located to heat the mandrel 106, the roller 116 or both. In another embodiment, the heating device 123 may be configured and oriented to heat a portion of the elongated member 102 and, more particularly, a portion of one or more composite material sheets laid down on the mandrel 106 to form the resulting elongated member 102 as shall be discussed in greater detail below. Such a heating device 123 may be particularly useful in forming elongated members from preimpregnated or "prepreg" materials. Such prepreg materials may include unidirectional tape or cloth material impregnated with a resin in a B-stage form (uncured). The application of heat to such prepreg materials may enable the material sheets to more readily conform to the shape of the mandrel 106 and, more importantly, helps to effect consolidation of the laminar structure, including multiple overlaying sheets of material, as such a structure is formed on the mandrel 106.

It is noted that the application of heat could be used to cure the elongate member 102 upon formation thereof (sometimes termed as "cure-on-the-fly"). However, the present invention also contemplates the ability to form an elongated member 102 which is substantially uncured. In other words, the present invention includes forming elongated members which are not significantly cured beyond the B-stage of a conventional prepreg material (also sometimes referred to as forming "green" structures or members). The ability to form uncured components provides for substantial flexibility in forming and manufacturing a composite structure including the ability to cocure the elongated members with a corresponding composite skin as is often desirable.

A cooling device 124 may also be coupled to the carriage assembly 108 to cool the elongated member 102, the roller 116, or some other tool or component associated with the apparatus 100. The cooling device 124 may include, for example, a vortex cooler, a system for circulating a cooling fluid through an interior portion of the roller 116, a cryogenic cooler, or a multiple phase system utilizing a condenser and evaporator.

Figure 2:
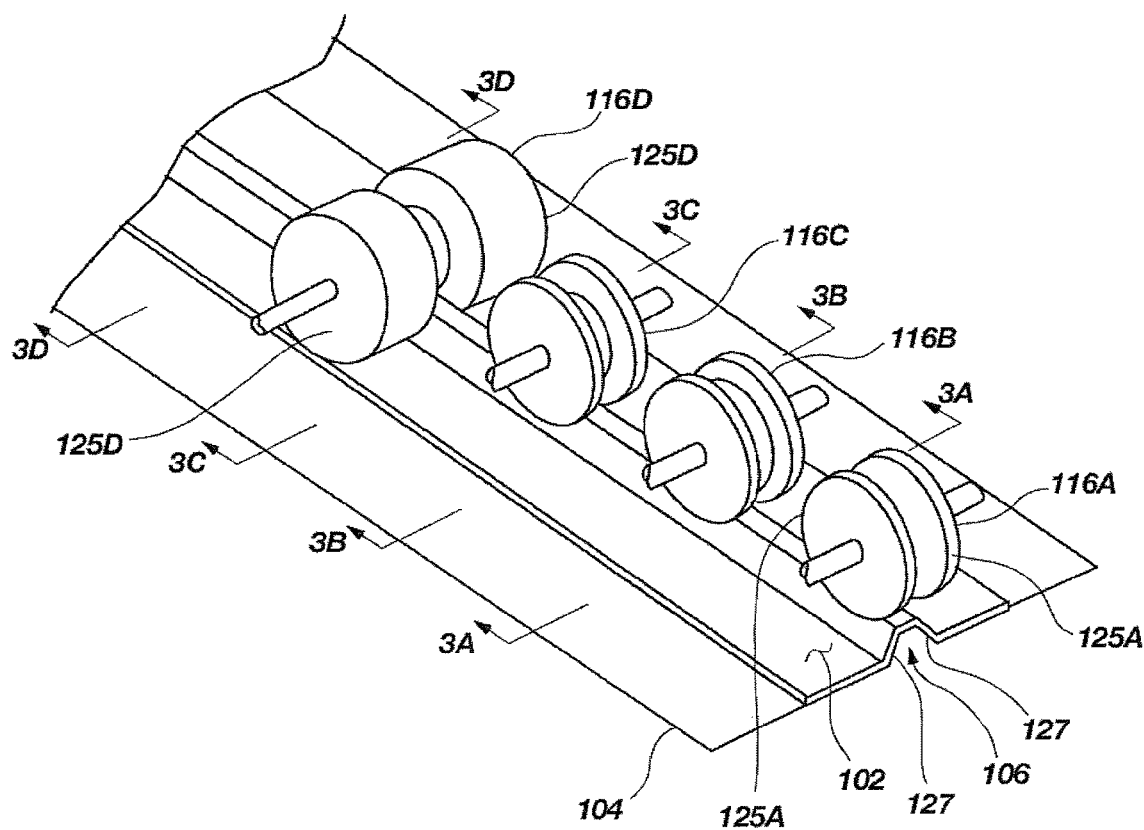
FIG. 2 is a perspective view of a portion of the apparatus of FIG. 1 in accordance with an embodiment of the present invention.

Referring now to FIG. 2 and FIGS. 3A-3D in conjunction with FIG. 1, the formation of an elongated member 102 is illustrated. In FIG. 2, the base 104 and mandrel 106 are shown without the carriage assembly 108 for purposes of clarity and convenience. FIG. 2 also shows a plurality of rollers 116A-116D engaging the elongated member 102 and associated mandrel 106 in at least a partially complementary manner. It is noted that if the particular apparatus 100 shown and described with respect to FIG. 1 is used, each roller 116A-116D may be individually and selectively coupled with the carriage assembly 108 and engaged with the elongated member 102 and mandrel 106. In other words, a first roller 116A may first be utilized with the carriage assembly 108 and then removed and replaced with a second roller 116B. The rollers 116A-116D may be sequentially and progressively interchanged to effect intermediate steps of formation on the elongated member 102.

Figure 3A:
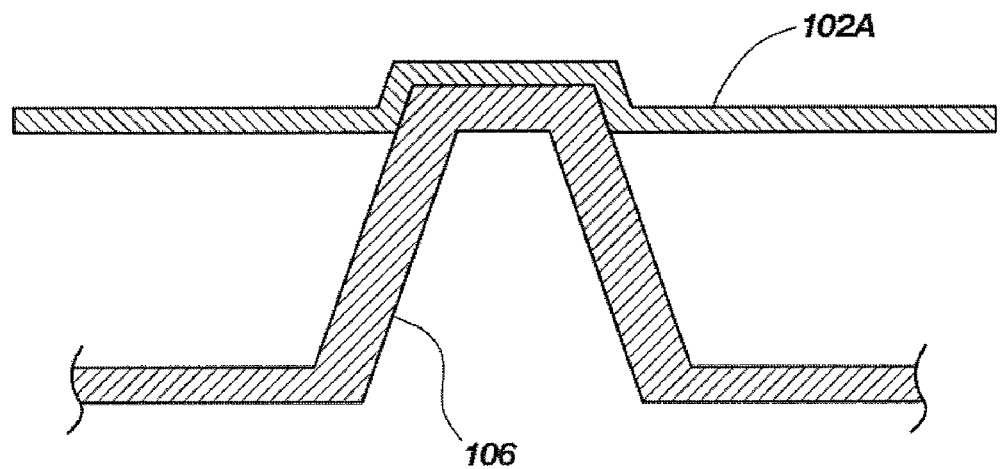
FIGS. 3A-3D show partial cross-sectional views of the apparatus of FIG. 1 during various stages of forming an elongated member therewith.
Figure 3B:
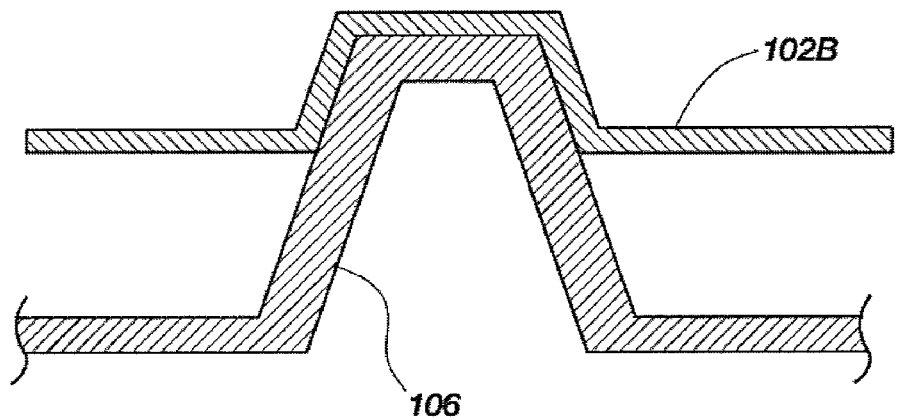
Figure 3C:
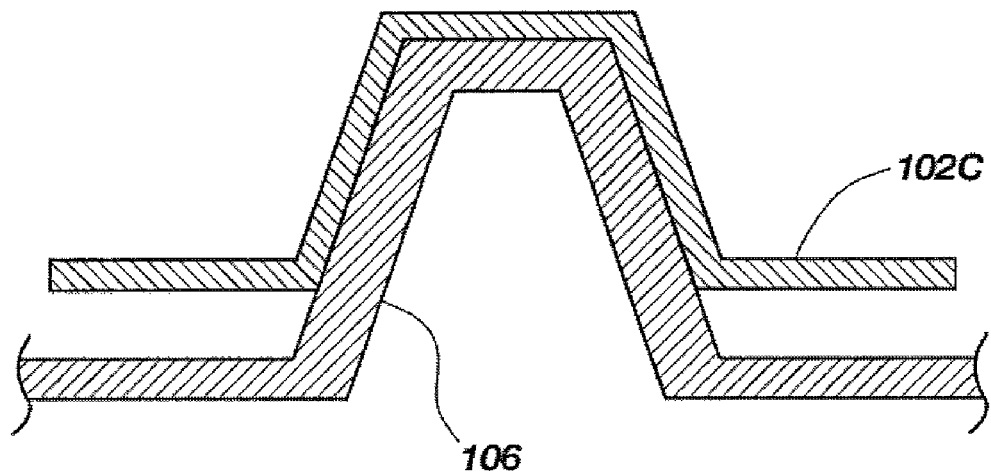
Figure 3D:
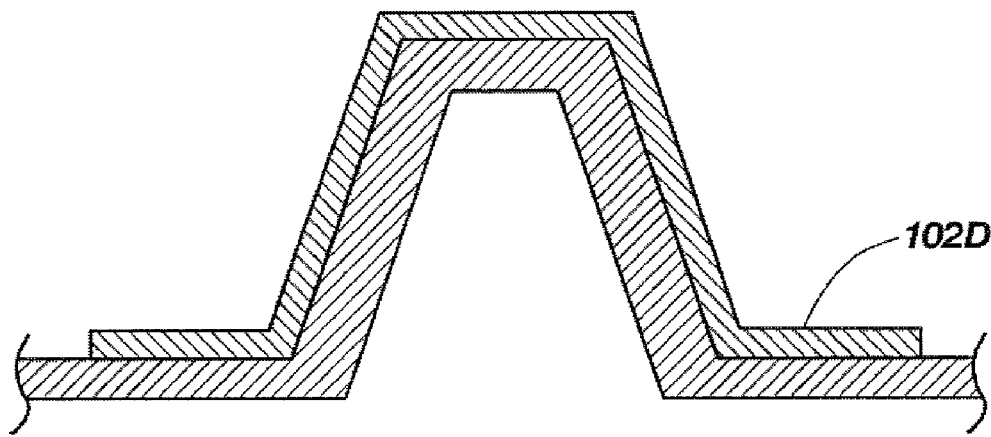

For example, in forming an elongated member 102, plies of material (e.g., prepreg material) may be positioned on the mandrel 106, and upon one another, in a laminar manner. The first roller 116A may then be coupled to the carriage assembly 108, configured to engage the mandrel 106 and rolled along the base 104 to form an intermediate structure 102A, or a structure exhibiting an intermediate cross-sectional geometry taken substantially transverse to the length thereof, such as shown in FIG. 3A. The first roller 116A may then be removed from the carriage assembly 108 and the second roller 116B may be coupled therewith. The second roller 116A engages the mandrel 106 and, as the carriage assembly 108 moves relative to the base 104, applies a rolling pressure to the first intermediate structure 102A to effect the formation of a second intermediate structure 102B such as shown in FIG. 3B. Similarly, the third roller 116C may be used to form a third intermediate structure 102C and the fourth roller 116D may be used to form the final structure 102D, or the structure exhibiting the final desired cross-sectional geometry as taken substantially transverse to the length of the elongated member 102.

In one embodiment, the formation of the elongated member 102 may conducted on a ply-by-ply basis. In other words, formation of the elongated member 102 may be effected by shaping a first ply to the desired cross-sectional geometry (e.g., by applying the ply to the mandrel 106 and passing the rollers 116A-116D thereover), applying a second ply of material and shaping the second ply of material to the desired cross-sectional geometry and conformally with the first shaped ply. The act of shaping the second or any subsequent ply through use of the rollers 116A-116D also serves to consolidate the plies and debulk the elongated member 102. Thus, the shaping and debulking of the elongated structure occurs as a substantially continuous and interrelated process.

In another embodiment, multiple plies may be placed over the mandrel 106 and shaped to a desired cross-sectional geometry simultaneously while also being consolidated and debulked. Thus, for example, two or three plies of material may be placed on the mandrel 106 and shaped and consolidated by the rollers 116A-116D followed by placement of two or three more plies of material over the shaped plies and the subsequent shaping thereof by the rollers 116A-116D.

The use of multiple rollers 116A-116D in sequentially forming intermediate structures 102A-102C and, ultimately, the final structure 102D, enables manipulation of the material (e.g., the prepreg plies) while imposing a relatively reduced amount of stress thereto than if the elongated member was formed in a single operation or a single pass of an individual roller. Perhaps more importantly, the multiple layers of, for example, prepreg material used to form the elongated member become substantially consolidated and debulked during the formation of the intermediate structures 102A-102C.

It is noted that more or fewer rollers may be used in forming the elongated members depending, for example, on the type of material being used, the number of plies or layers of material being utilized to form the elongated member 102, the number of plies being shaped during a given operation, and/or the desired cross sectional shape of the resulting elongated member 102. Similarly, the incremental change in roller size may be adjusted depending on similar parameters.

It is also noted that, in forming intermediate structures, the rollers 116A-116D are progressive in their respective geometries. In other words, the first roller 116A only partially engages the mandrel and material laid thereover in that the outer sections 125A only extend partially down the side walls 127 of the complementary mandrel 106. The second roller 116B, while still only partially engaging the mandrel 106, does so more than did the first roller 116A. Similarly, the third roller 116C is configured to more fully engage the mandrel 106 than does the second roller 116B. Finally, the fourth roller 116D is configured to substantially fully engage the mandrel 106 such that its outer sections 125D extend fully down the side walls 127 of the mandrel 106.

Figure 4:
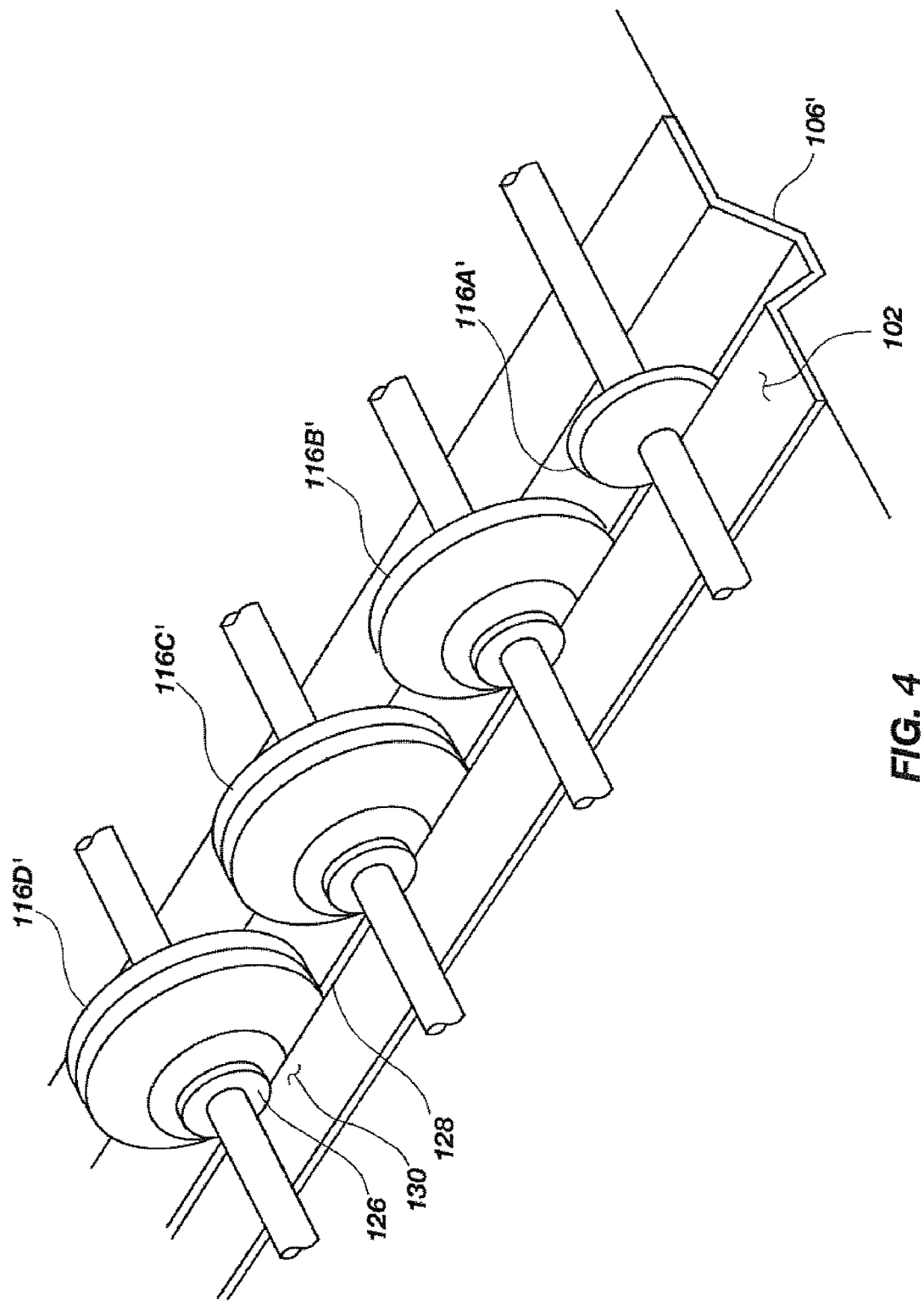
FIG. 4 is a perspective view of a portion of the apparatus of FIG. 1 in accordance with another embodiment of the present invention.

The embodiment shown and described with respect to FIGS. 1, 2 and 3A-3C include a male mandrel 106 and rollers 116A-116D that exhibit a complementary female geometry. However, in another embodiment, such as shown in FIG. 4, a female mandrel 106' may be utilized with a plurality of complementary male rollers 116A'-116D' wherein the rollers 116A'-116D' press the composite material into the female mandrel 106' to form the elongated member 102. As with the previously described embodiment, the rollers 116A'-116C' may be sequentially and progressively used to form intermediate structures with the fourth or last roller 116D' being used to impose the final cross-sectional geometry to the elongated member 102 (or to individual plies of the elongated member, as discussed hereinabove). One or more of the rollers 116A'-116D' may include laterally extended, reduced diameter sections 126 to help form the upper corners 128 and the flags 130 or laterally extending portions of the elongated member 102.

Figure 5:
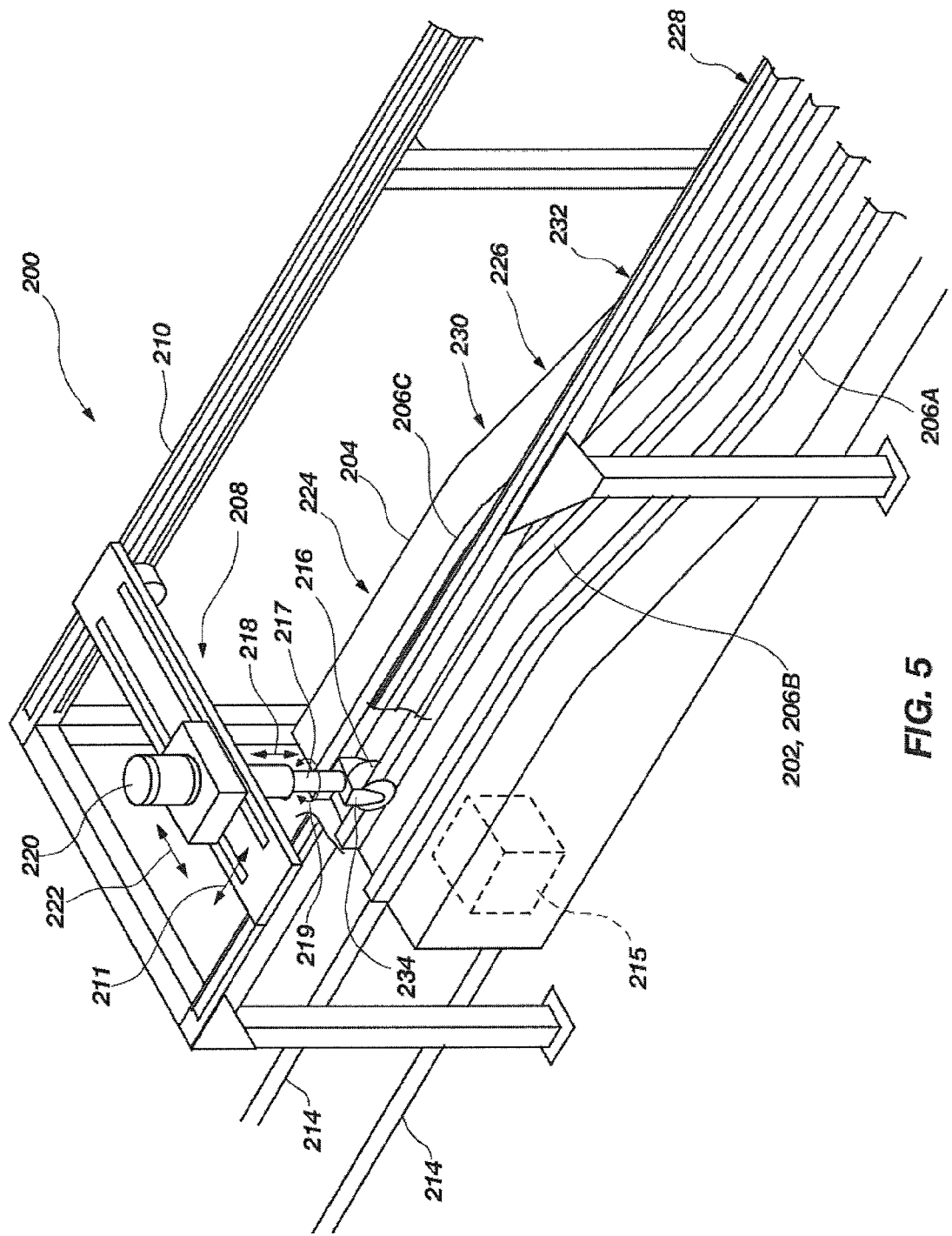
FIG. 5 is a perspective view of another apparatus for forming elongated composite members in accordance with another embodiment of the present invention.

Referring now to FIG. 5, an apparatus 200 for forming an elongated member 202 is shown in accordance with another embodiment of the present invention. The apparatus includes a movable base 204 having a plurality of mandrels 206A-206C. A carriage assembly 208 is movably coupled with a stationary gantry 210. The carriage assembly 208 is configured to horizontally travel along the gantry 210 as indicated by directional arrow 211. The base 204 is also configured to travel along tracks 214 relative to both the gantry 210 and the carriage assembly 208. The base 204 may be motivated along the tracks 214 by an appropriate drive mechanism 215 such as a motor and gear box. The movement of the base 204 along the tracks 214 enables various tools (i.e., bases of other configurations) to be introduced beneath the gantry 210 from either end thereof.

A roller 216, configured to complementarily engage one or more of the mandrels 206A-206C, may be removably coupled to the carriage assembly 208 and may be coupled to an actuator 217 such that the roller 216 may be moved in the substantially vertical direction as indicated by directional arrow 218. The roller 216 may also be configured to swivel or rotate about a substantially vertical axis as indicated by directional arrow 219. The rotation of the roller 216 about the substantially vertical axis may be accomplished, for example, by allowing the roller to freely swivel such that it generally follows the mandrel (e.g., 206B) with which it is engaged as the carriage assembly 208 moves in the direction of directional arrow 211. In another embodiment, an actuator 217 may be used to motivate the roller 216 about the substantially vertical axis as may be desired.

A drive mechanism 220 may be configured to move the roller 216 and its associated actuator 217 laterally with respect to the base 204 and the gantry 210 as indicated by directional arrow 222. The ability to control the movement of the carriage assembly 208 relative to the base 204 allows considerable flexibility in forming elongated members 202. For example, the same roller 216 may be used to selectively and independently engage each of the plurality of mandrels 206A-206B.

Additionally, the elongated members 202 may be formed as relatively complex shapes, not only with respect to their cross-sectional geometries, but also with respect to their geometries along a defined longitudinal axis. For example, the base 204 of the presently described apparatus 200 includes a first relatively flat section 224, a sloped section 226, and a second relatively flat section 228 with the sloped section 226 being connected to adjacent flat sections 224 and 228 by curved transition sections 230 and 232. The mandrels 206A-206C generally comply with the contour or geometry of the base 204. Thus, as the carriage assembly 208 travels longitudinally as indicated by directional arrow 211, the roller 216 must be vertically displaced as indicated by directional arrow 218 in order to remain engaged with a corresponding mandrel (e.g., 206B).

In other embodiments, the mandrels 206A-206C may deviate laterally relative to the longitudinal direction of the base 204 (i.e., in the direction indicated by directional arrow 222). Such complex geometries may be accommodated by the present invention through the various degrees of freedom offered by the arrangement shown. It is noted that, in one embodiment, the roller 216 may be coupled to a wrist 234 which allows the axis upon which the roller 216 rotates to be varied. Thus, the roller 216 may be able to remain in substantial contact with a mandrel (e.g., 206B) even if the mandrel 206B exhibits a twist or rotation relative about its longitudinal axis and, thereby, enable the formation of elongated members 202 exhibiting a similar twist relative to their respective longitudinal axes.

In forming elongated members 202 with the above described apparatus 200, the roller 216 may be operated in a manner similar to that described above with respect to FIGS. 1, 2, 3A-3C and 4. In other words, intermediate structures may be formed by using a plurality of staged rollers (e.g., rollers which progressively change in shape to progressively engage the associated mandrels 206A-206C). Additionally, the mandrels 206A-206C may be either male or female components and the corresponding rollers 216 formed to complement such mandrels as necessary or desired. Also, the elongated member 202 may be formed by shaping individual plies one at a time, or by shaping a plurality of plies simultaneously.

Figure 6:
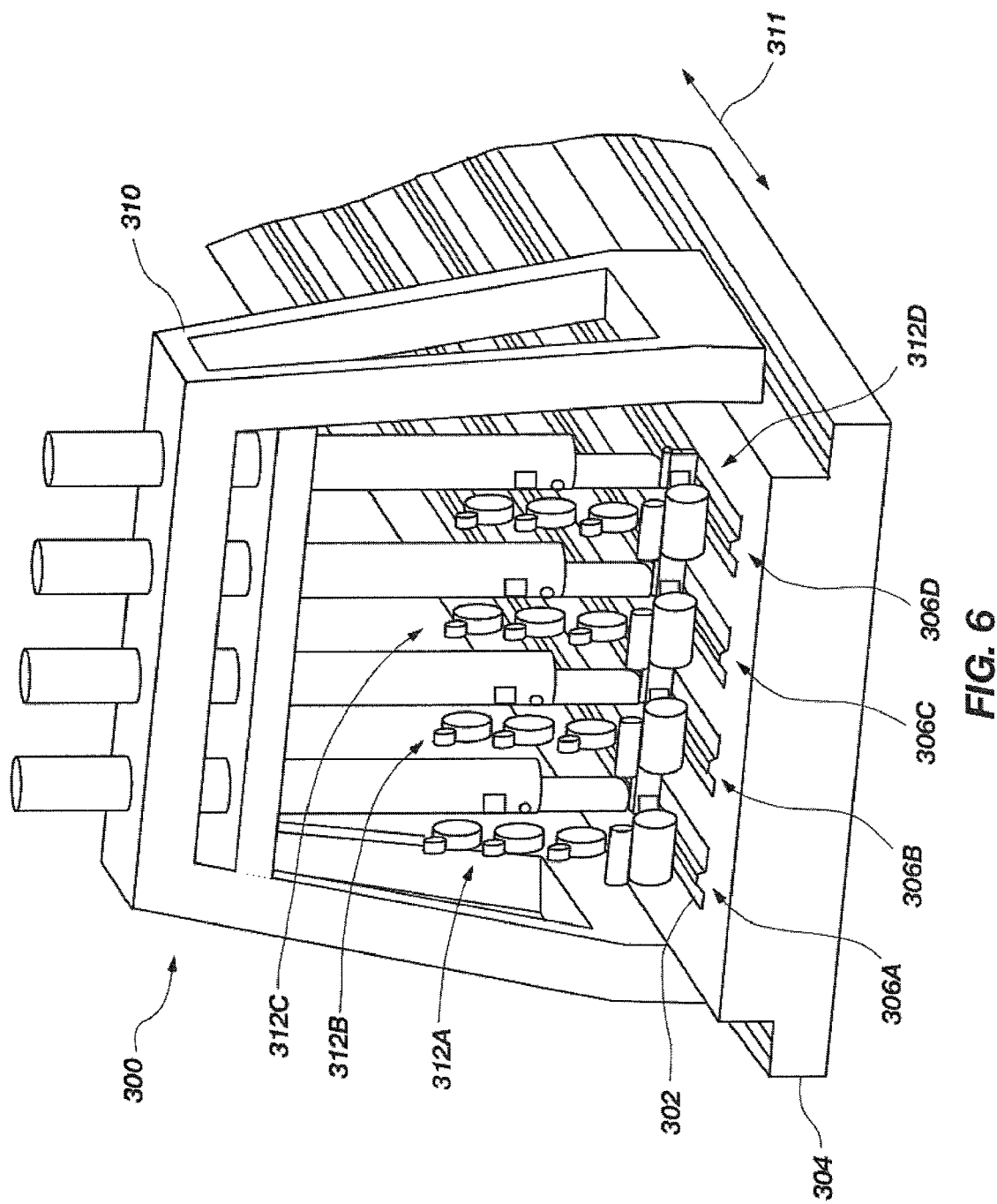
FIG. 6 is a perspective view of another apparatus for forming elongated composite members in accordance with yet another embodiment of the present invention.

Referring now to FIG. 6, an apparatus 300 for forming elongated members 302 is shown in accordance with another embodiment of the present invention. The apparatus includes a base 304 having a plurality of mandrels 306A-306D mounted or located thereon. A positionable gantry 310 (or carriage assembly) is movably coupled with the base 304 and configured to move, for example, in a longitudinal direction as indicated by directional arrow 311 relative to the base 304. Associated with each mandrel 306A-306D is a device 312A-312D for laying up and forming a plurality of plies of composite material thereon. The devices 312A-312D may each include an automated material dispensing device configured to dispense, for example, plies of cloth or tape material, and one or more rollers for forming the plies of composite material into a desired cross-sectional geometry.

Such an automated dispensing device may include cut, clamp and start mechanisms such that individual plies may be dropped and added on the fly as desired or required depending on the configuration of the elongated member 302 being formed. Additionally, an automated dispensing device may include a mechanism for maintaining tension on the ply of material as it is being dispensed on to a mandrel 306A-306D. Application of tension to the material ply may be desirable to keep any wrinkles from developing in the material as the elongated members 302 are being formed. In one exemplary embodiment, a force of approximately 2 to 15 pounds-force (lbf) (approximately 8.9 to 66.7 Newtons (N)) may be applied to material plies as they are disposed on the mandrels 306A-306D.

Each device 312A-312D may further include associated actuators or drive mechanisms in order to move the devices 312A-312D relative to the base 304 and to apply pressure via an associated roller to any material laid up on the mandrels 306A-306D. Each device 312A-312D may be programmed to form identical stiffeners or form different stiffeners depending on the individual configuration of the mandrels 306A-306D mounted on the base 304.

Figure 7:
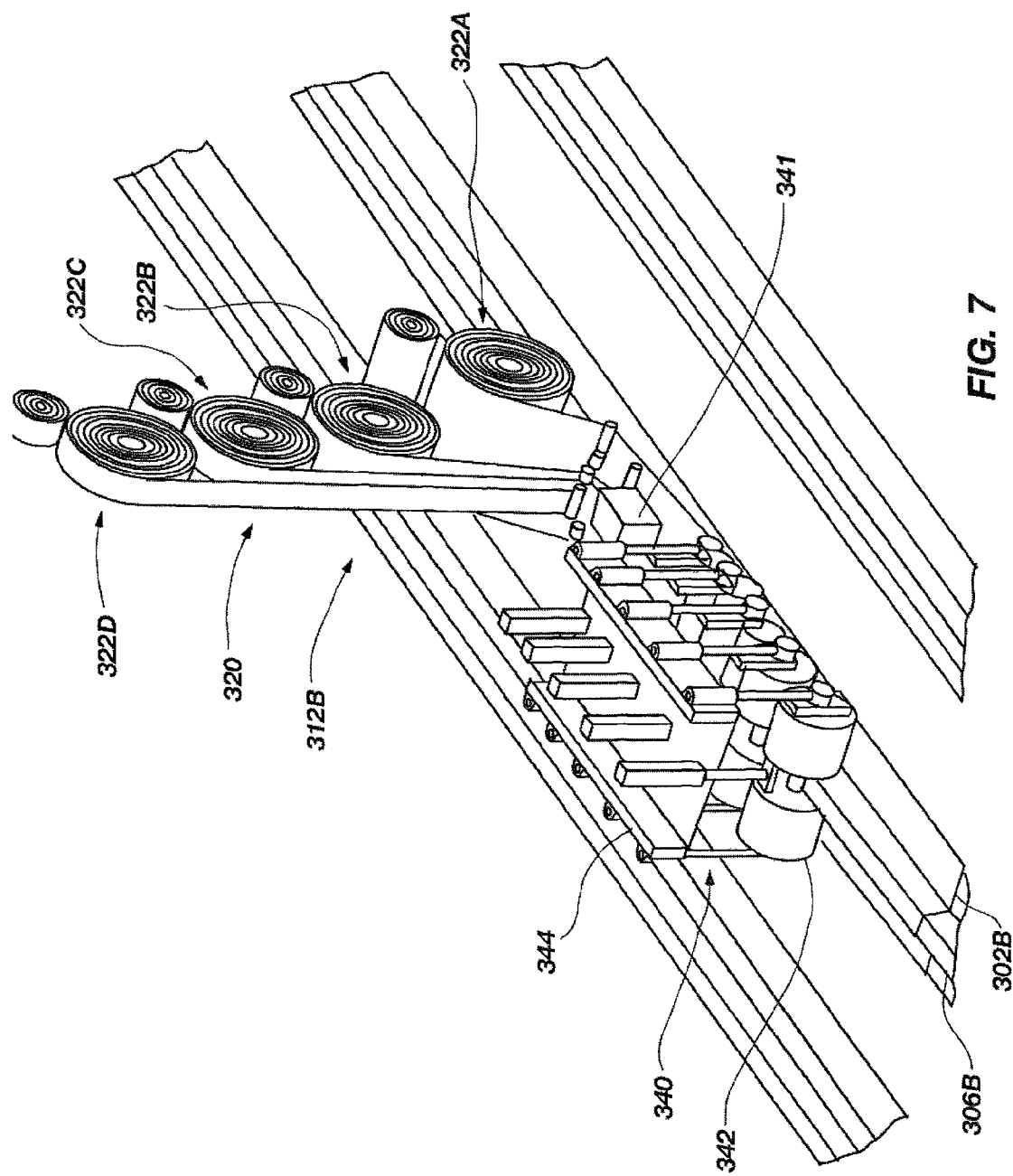
FIG. 7 is an enlarged perspective view of a portion of the apparatus shown in FIG. 6.

Referring to FIG. 7, an individual device 312B is shown positioned above its corresponding mandrel 306B without the associated gantry 310 (FIG. 6) for clarity in describing the operation of the device 312B. The device includes an automated material dispenser 320 including a plurality of ply dispensers 322A-322D for dispensing and laying up plies of composite material onto the mandrel 306B. It is noted that the ply dispensers 322A-322B may be configured to dispense plies of composite material, such as prepreg tape or cloth, which vary in width. Using such varied width plies of material, the elongated member 302B may be configured such that it exhibits a greater thickness (i.e., by inclusion of more plies) in one portion of the elongated member 302B than another.

Figure 8A:
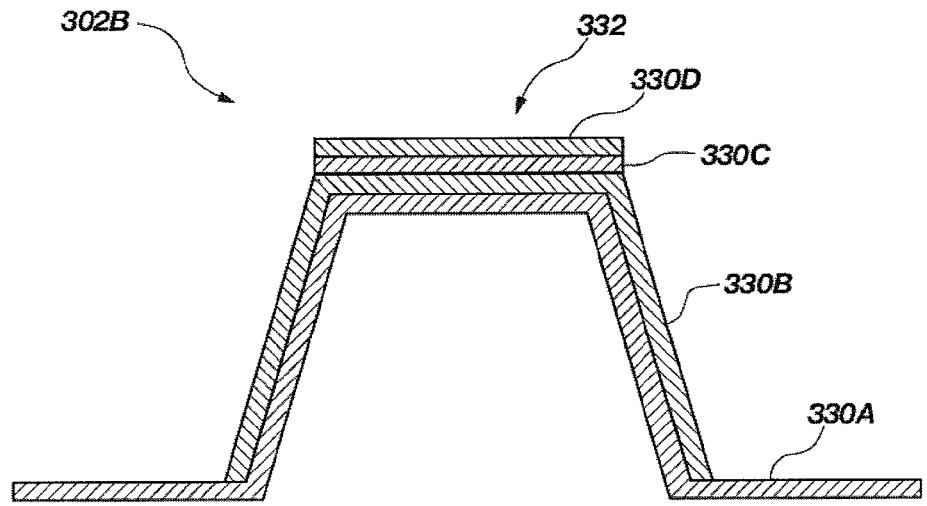
FIGS. 8A and 8B show cross-sectional views of elongated reinforcing members formed in accordance with various aspects of the present invention and at various stages of manufacture.

For example, referring briefly to FIG. 8A in conjunction with FIG. 7, the first ply dispenser 322A may be configured to dispense a ply 330A which extends throughout the entire "width" or extent of the elongated member's cross-sectional geometry. Another ply dispenser 322C may dispense a ply 330C which only extends across the upper lateral portion 332 (e.g., the cap) of the elongated member's cross-sectional geometry. Thus, the elongated member 302B may be designed and tailored with respect to ply or material placement in accordance with expected loadings and applied stresses by increasing or reducing the effective number of plies in a given section or portion thereof. Additionally, it is noted that the individual plies of material may be configured to exhibit substantially any desired fiber orientation (or orientations) as may be needed in accordance with expected loadings and stress states of the elongated member 302B. Thus, for example, a first ply may be formed of a material exhibiting a 0° fiber orientation, a second ply may include material exhibiting a 45° fiber orientation and so on. Of course other fiber orientations and other ply configurations may be used. The ability to selectively orient fibers in such a manner is a significant advantage over other forming processes, such as pultrusion.

Figure 8B:
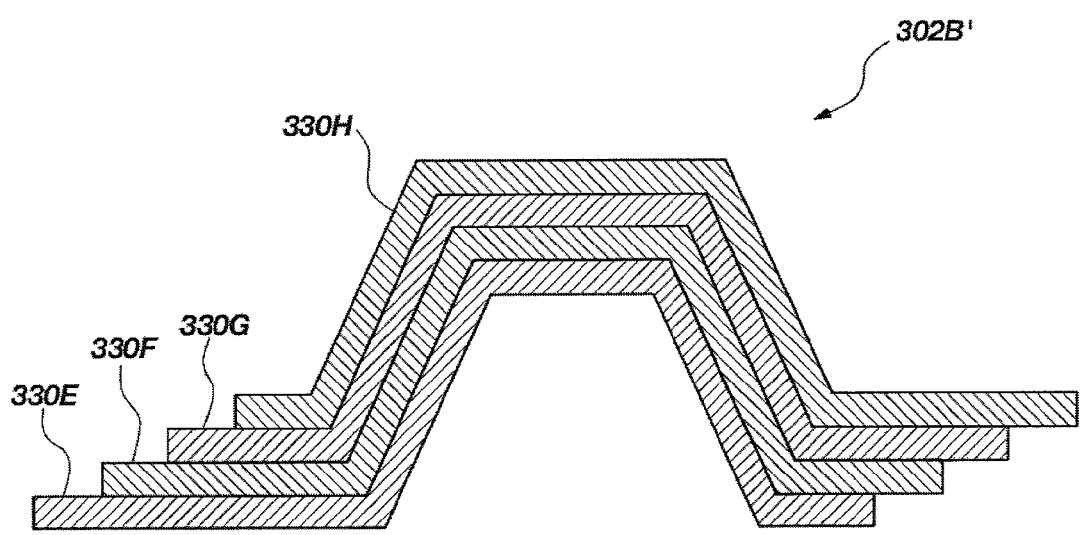

Referring briefly to FIG. 8B in conjunction with FIG. 7, another embodiment may include plies 330E-330H which exhibit similar widths to one another but which are staggered or laterally displaced relative to one another. The resulting elongated member 302B' thus has a step-like configuration on one lateral side thereof and a reversed image of the step like configuration on the opposing lateral side thereof. Such a configuration enables the interlocking of multiple elongated members 302B' in a side-by-side relationship if so desired. The staggered or step-like configuration may be formed through appropriate control of the ply dispensers 322A-322D such as, for example, by laterally displacing one ply dispenser (e.g., 322A) relative to another (e.g., 322B).

In another embodiment, one or more edge ply cutting devices 341 may be utilized to trim the edge (or edges) of any ply 330A-330H (FIGS. 8A and 8B) dispensed over an associated mandrel 306A-306C. Such a cutting device 341 may include a knife, a rolling blade, a laser, or other appropriate cutting means configured to trim the edge of a ply 330A at a desired width or lateral position as the gantry 310 (not shown in FIG. 7) moves longitudinally relative to a mandrel 306A-306C.

Still referring to FIG. 7, the individual device 312B also includes a forming device 340. The forming device 340 may include a plurality of rollers 342 configured to at least partially complementarily engage with the mandrel 306B and thereby sequentially form, in a substantially continuous manner, the desired cross-sectional geometry of the elongated member 302B. The rollers 342 may be individually coupled to one of a plurality of actuators 344 such as, for example, hydraulic or pneumatic cylinders, so that pressure may be applied through the rollers as they pass over the plurality of plies of material laid upon the mandrel 306B. Thus, rather than interchanging rollers which pass over an associated mandrel in individual passes, such as described above with respect to other embodiments, the plurality of rollers 342 may be combined in a single unit to immediately follow one another along the mandrel 306B during a single pass to form the desired cross-sectional geometry of the elongated member 302 or of one or more plies thereof.

Figure 9:
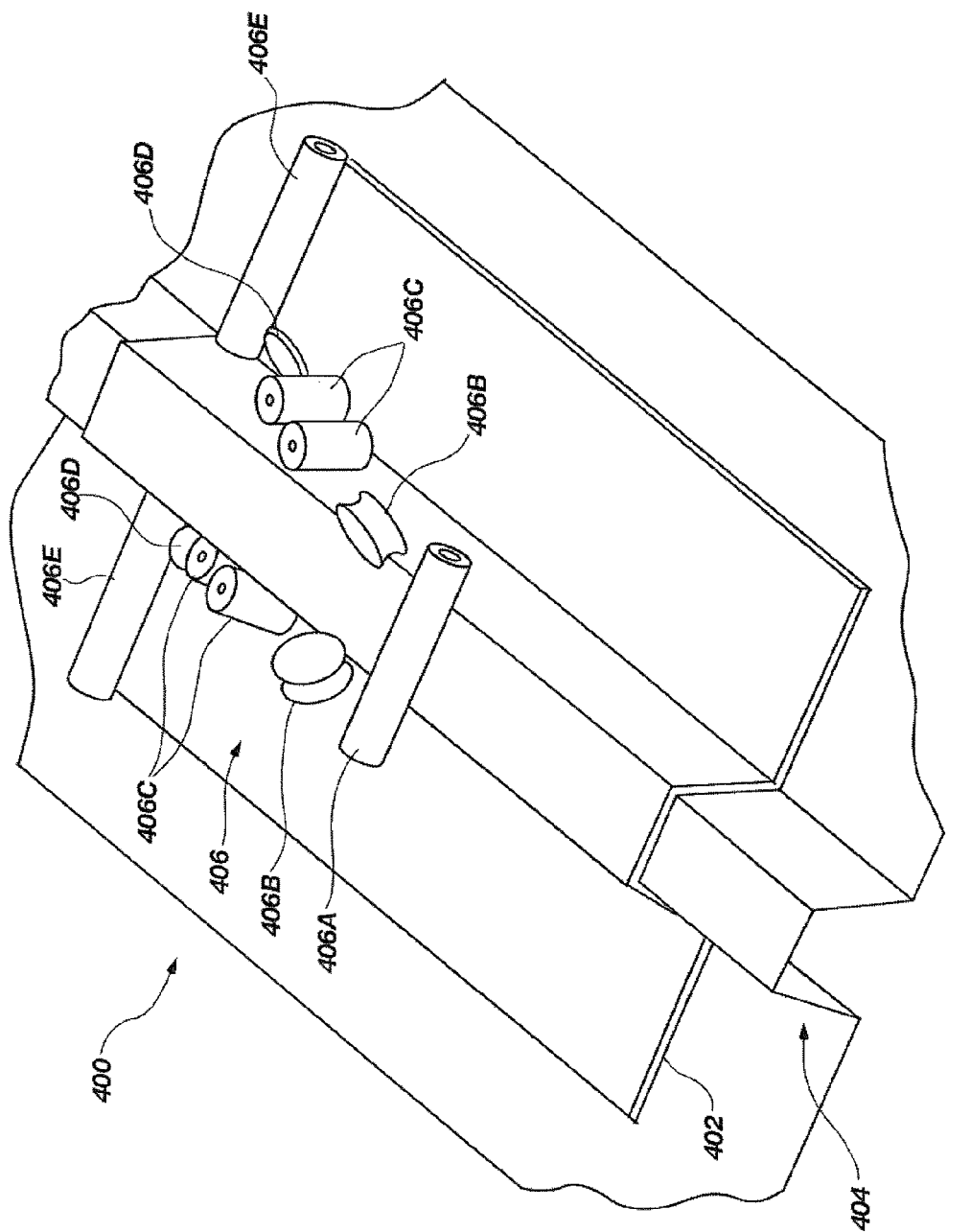
FIG. 9 is a perspective view of an apparatus for forming elongated composite members in accordance with a further embodiment of the present invention.

Referring now to FIG. 9, an apparatus 400 for forming elongated members 402 is shown in accordance with yet another embodiment of the present invention. While not shown for purposes of convenience and clarity, the apparatus 400 may include various components, such as described above, including a base, a gantry, and/or a carriage assembly which are relatively movable with respect to each other. The apparatus may also include, for example, an automated material dispensing device for laying a plurality of plies of composite material onto the mandrel 404.

The apparatus 400 includes a plurality of rollers 406 (individually identified as rollers 406A-406E) which are each configured to engage a specific portion of the mandrel 404 (or the material plies laying thereover) in order to form a desired cross-sectional geometry. For example, a first roller 406A may be configured to press the plies of material onto the top surface of the mandrel 404. One set of rollers 406B may be configured to form the plies of material about the exterior corners of the male mandrel 404. Another set of rollers 406C may be configured to press the plies of material against the sides of the mandrel 404. A further set of rollers 406D may be configured to press the plies of material into the interior corners of the mandrel 404, and a final set of rollers 406E may be configured to press the plies of material against the laterally extending portions of the mandrel 404. Thus, the plurality of rollers 406 works collectively to substantially continuously form an elongated member 402 of a desired cross-sectional geometry over the mandrel 404.

Figure 10:
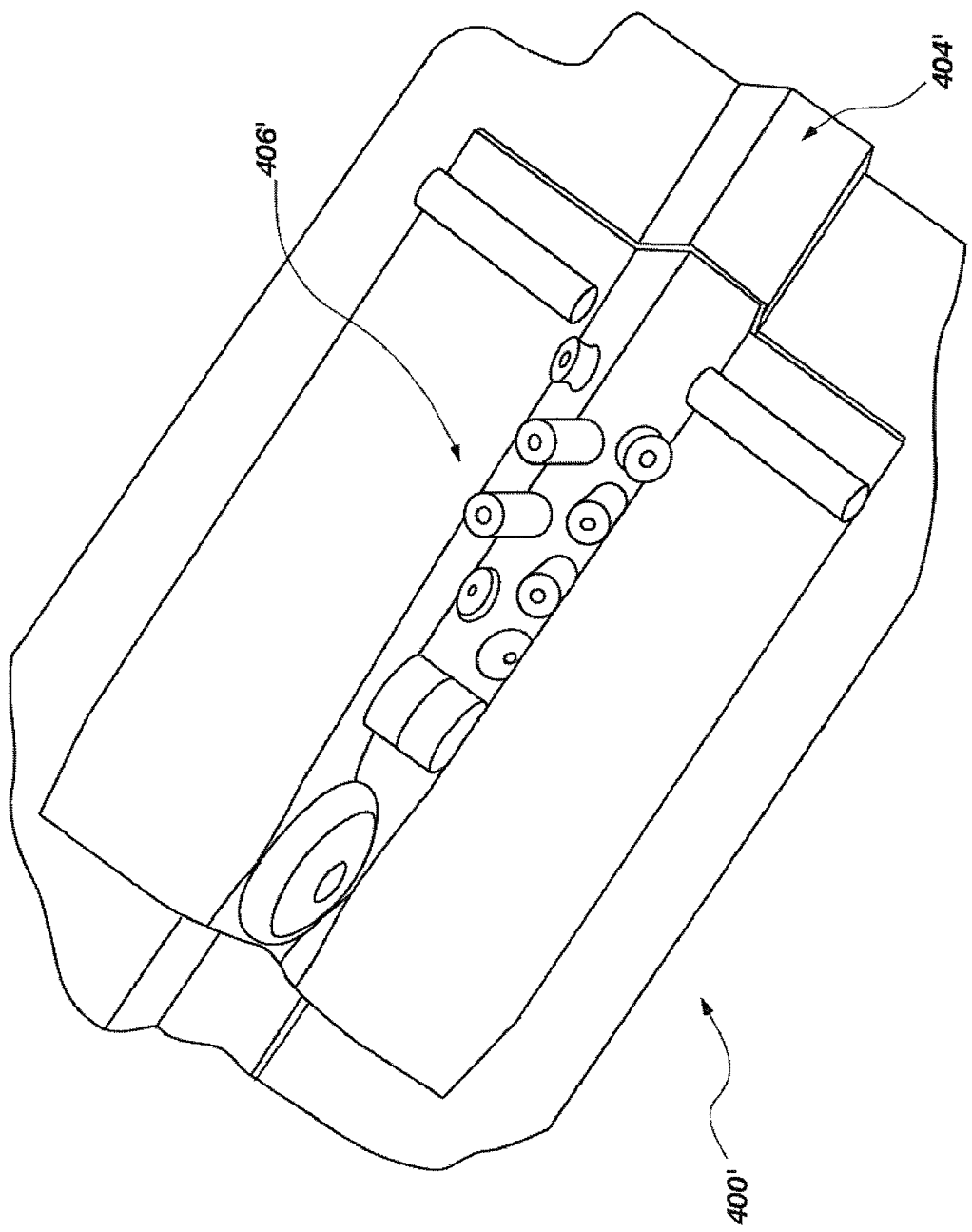
FIG. 10 is a perspective view of an apparatus for forming elongated composite members in accordance with yet a further embodiment of the present invention.

Referring briefly to FIG. 10, another embodiment of the apparatus 400' is shown, similar to that shown and described with respect to FIG. 9, except that the mandrel 404' is configured as a female mandrel and the rollers 406' are configured to engage specifically identified portions thereof in order to form the elongated member 402.

Figure 11:
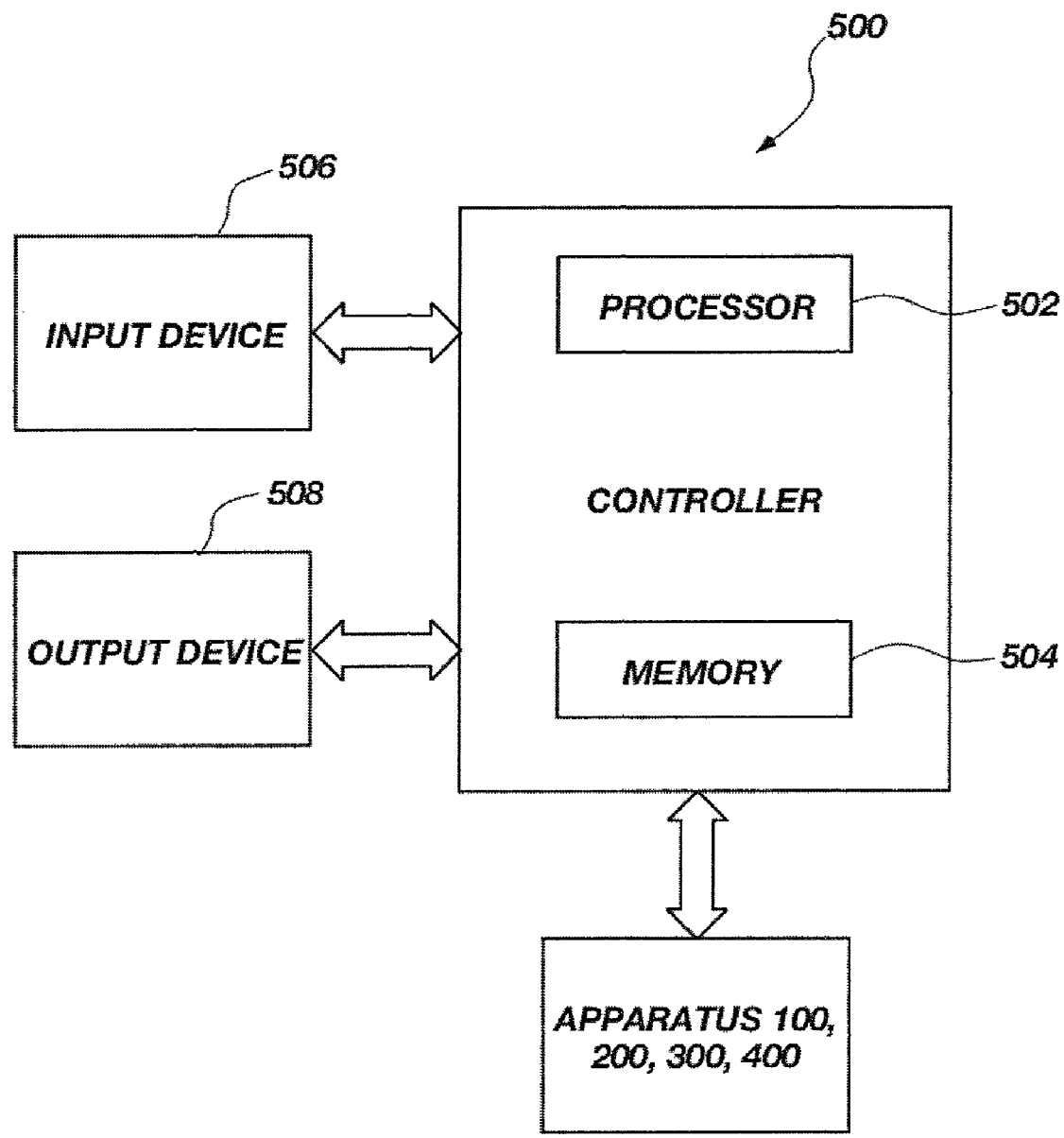
FIG. 11 is a schematic showing the use of a controller with the an apparatus for forming elongated composite members in accordance with an embodiment of the present invention.

Referring briefly to FIG. 11, any of the above apparatuses may be operatively coupled with a controller 500 which may include, for example, a computer having a processor 502, a memory device 504, one or more input devices 506 and one or more output devices 508. Such a controller may be programmed to control the associated apparatus 100, 200, 300 and 400 such as, for example, using computer number control (CNC) programming. The controller 500 may be configured to control the relative positions of, for example, the base, the carriage assembly, the gantry, and the roller devices of the various apparatuses set forth herein including what may be termed the vertical, yaw, roll, and pitch positions and orientations of the rollers of a given apparatus. The controller 500 may be configured to not only control the vertical position of the roller relative to the mandrel that the roller is intended to engage, but also the amount of pressure or force applied by the roller to the mandrel or the one or more plies of material laid thereover. Furthermore, the controller 500 may be configured to control the amount of heat being applied to the mandrel or associated plies of material, the position of the material relative to a mandrel, and the clamping, cutting and starting of material being fed from an automated material dispenser.

Figure 12A:
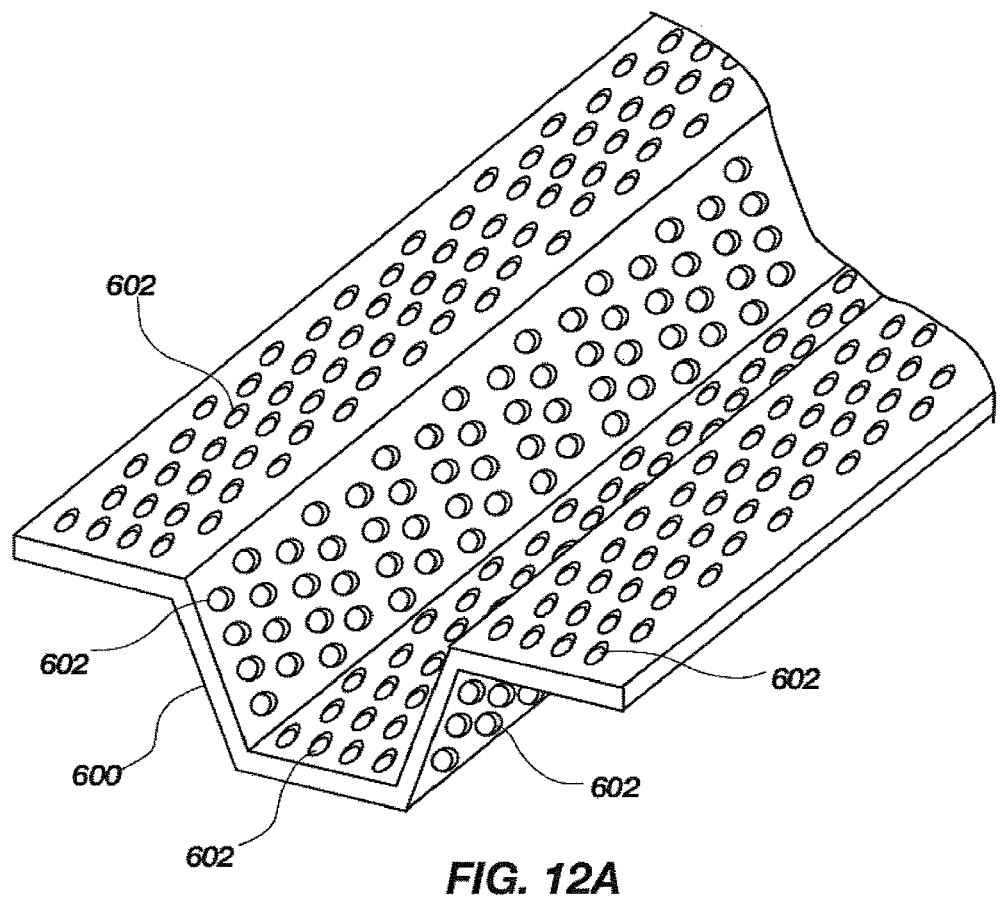
FIG. 12A is a perspective view of a mandrel used in forming an elongated composite member in accordance with an embodiment of the present invention.
Figure 12B:
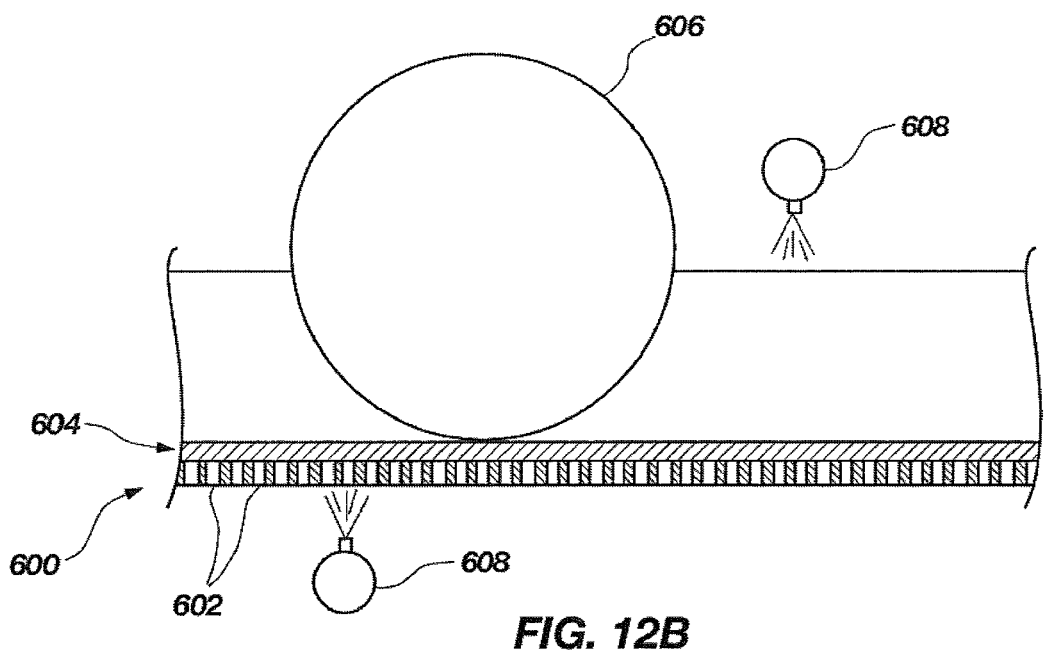
FIG. 12B is a partial cross-sectional side view of the mandrel shown in FIG. 12A during formation of an elongated composite member in accordance with an embodiment of the present invention.

While the above described embodiments have largely been discussed using the example of individual prepreg materials being laid up on associated mandrels, it is noted that nonimpregnated fiber materials may be utilized with such materials being laid upon on an associated mandrel while substantially simultaneously infusing or impregnating the plies of material with an appropriate resin or binder. For example, referring now to FIGS. 12A and 12B, a mandrel 600 may be formed as a perforated structure having a plurality of apertures 602 or openings defined therein. As plies of material 604 are laid over the mandrel 600, one or more rollers 606 may complementarily engage the mandrel 600 to form the plies into a desired cross-sectional geometry as described above herein. Additionally, one or more spray nozzles 608 or other deposition devices may infuse resin or binder into the laid up and formed plies to form a shaped, prepreg structure. The resulting elongated member may be partially cured or cured to a B-stage such that the elongated member may be subsequently cocured with an associated composite structure at a later time.

Figure 13A:
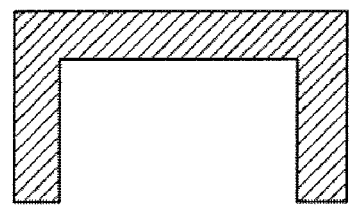
FIGS. 13A-13E are cross-sectional views of exemplary geometric configurations which may be formed in accordance with the present invention.
Figure 13B:
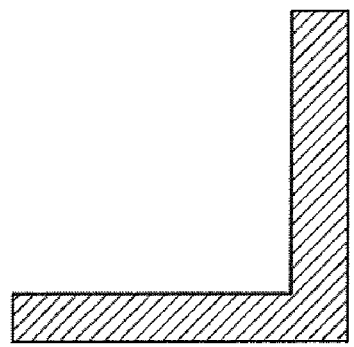
Figure 13C:
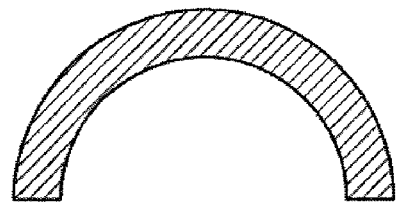
Figure 13D:
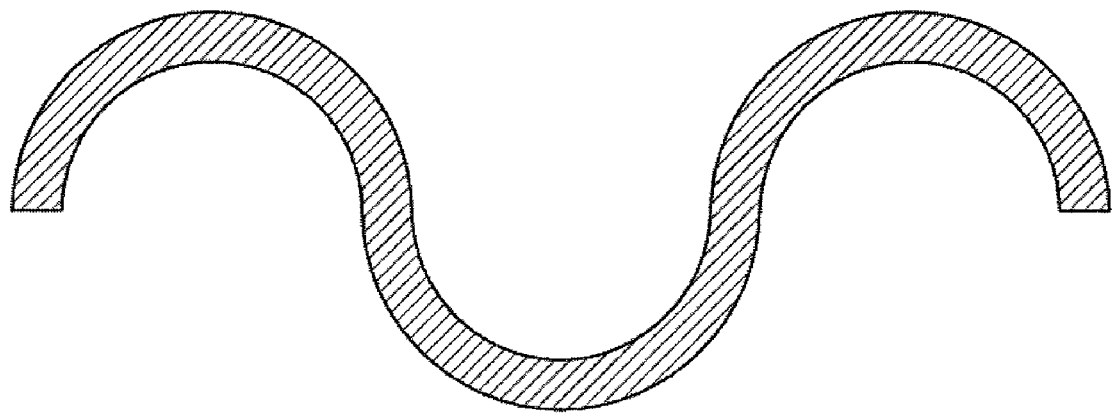
Figure 13E:
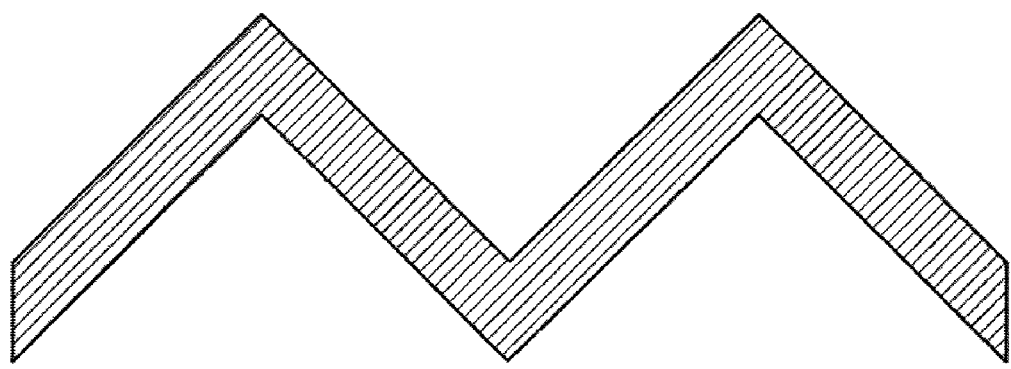

It is noted that the various illustrative embodiments of the invention described above herein have generally shown an exemplary cross-sectional geometry of a hat, or the formation of an elongated member as a hat channel. However, it is contemplated that the present invention may be used to form elongated members of other cross-sectional geometries. For example: at least one C-channel may be formed as illustrated in FIG. 13A; at least one structural angle (or similarly a J-shaped or L-shaped cross section) may be formed as illustrated in FIG. 13B; a structural member exhibiting at least one arcuate section may be formed as illustrated in FIG. 13C, which may also include flanges to form an omega shape if so desired; a plurality of arcuate cross-sectional shapes may be formed in a single structural member as shown in FIG. 13D; or a plurality of structural angles may be formed in a single structural member as shown in FIG. 13E. Also, various features of such cross-sectional geometries may be combined as desired depending, for example, on the expected loadings such an elongated member will experience.

Figure 14A:
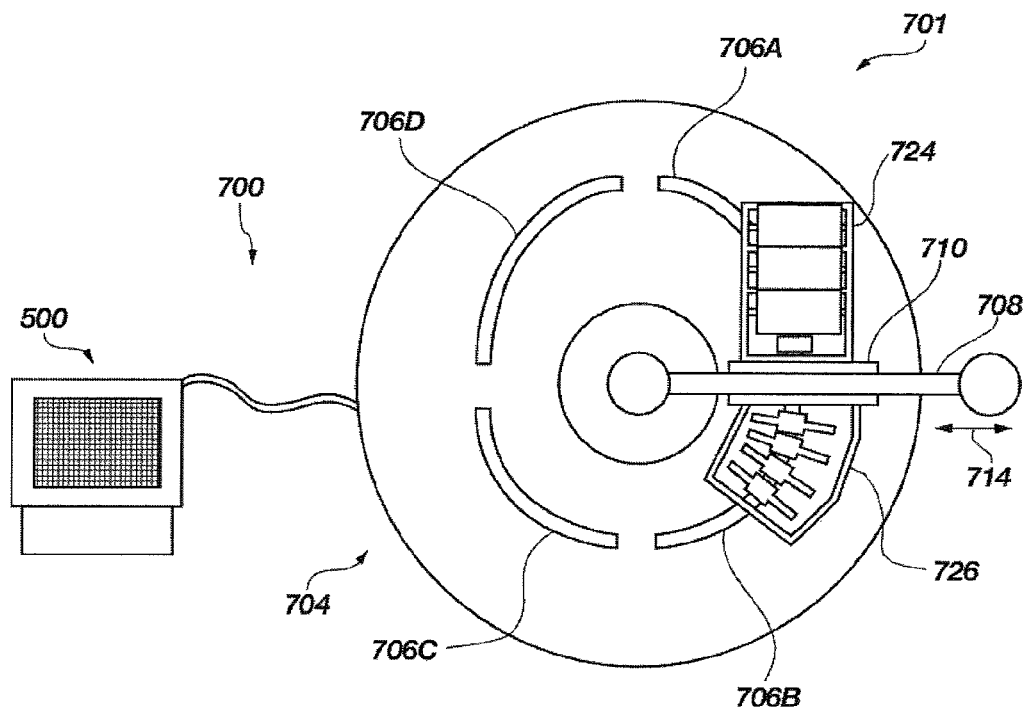
FIGS. 14A and 14B show a plan view and an elevational view, respectively, of a system and apparatus for forming elongated composite members in accordance with yet another embodiment of the present invention.
Figure 14B:
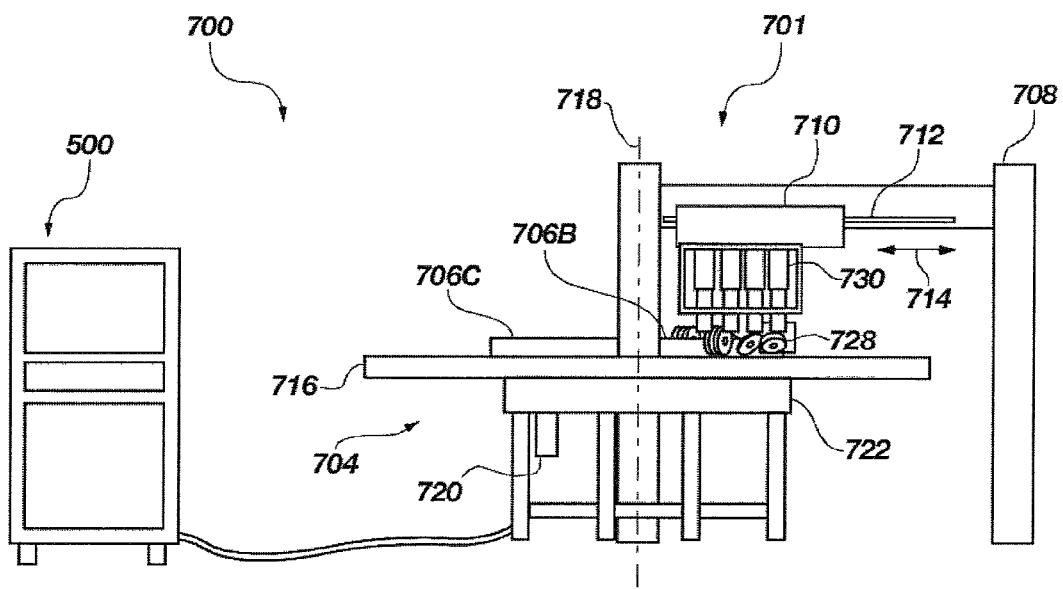

Referring now to FIGS. 14A and 14B, a system 700 is shown including a controller 500 in communication with, and operably coupled to, an apparatus 701 for forming an elongated member 702 (FIG. 17A) that exhibits a curved or arcuate portion along the length thereof. The apparatus 701 includes a base 704 having a plurality of mandrels 706A-706D located thereon. The apparatus 701 further includes a gantry 708 and a carriage assembly 710 movably coupled to the gantry 708. For example, the gantry 708 may include one or more slides 712 which are operably coupled with bearings (not shown) associated with the carriage assembly 710 such that the carriage assembly 710 may move relative to the gantry 708 as indicated by directional arrow 714.

The base 704 may include a rotary table 716 configured to rotate about a defined axis 718 relative to the gantry 708 and carriage assembly 710. A motor 720 or other actuator may be operably configured to rotate the rotary table 716 relative to a supporting portion 722 of the base 704. As the rotary table 716 rotates, the carriage assembly 710, along with its associated components, may move relative to the gantry 708 (i.e., in the direction indicated by directional arrow 714) so as to track the position of the mandrels 706A-706D as each mandrel 706A-706D sequentially passes therebeneath. The carriage assembly 710 may be configured to actively track the position of a mandrel 706A-706D passing therebeneath such as through the use of the controller 500 and an actuator coupled to the carriage assembly 710. In another embodiment, the carriage assembly 710 may be configured to passively track the position of a mandrel 706A-706D passing therebeneath, such as by the engagement of one or more components of a forming device 726 with the mandrels 706-706D as will become apparent through subsequent discussion of such a forming device 726.

It is noted that, while the exemplary embodiment described with respect to FIG. 14 is described as including a rotary table 716 which rotates about a defined axis 718 relative to the gantry 708 and carriage assembly 710, other embodiments are contemplated as being utilized in conjunction with the present invention. For example, the base 704 may include a nonrotating table while the carriage assembly 710 and gantry 708, or similar structures, are configured to move relative to the table such as by rotating about a defined axis 718.

It is also noted that the mandrels 706A-706D may not necessarily exhibit a constant radius of curvature throughout their respective lengths. It is also noted that each mandrel 706A-706D may exhibit a different length, radius of curvature or other geometric characteristic than any of the other mandrels.

A material dispensing device 724 and a forming device 726 are coupled with the carriage assembly 710. As the rotary table 716 rotates relative to the gantry 708, the material dispensing device 724 is configured to place one or more plies of material onto the mandrels 706A-706D. The forming devices 726 may include a plurality of rollers 728 coupled to actuators 730 and configured to shape the plies of material placed on the mandrels 706A-706D.

Figure 15A:
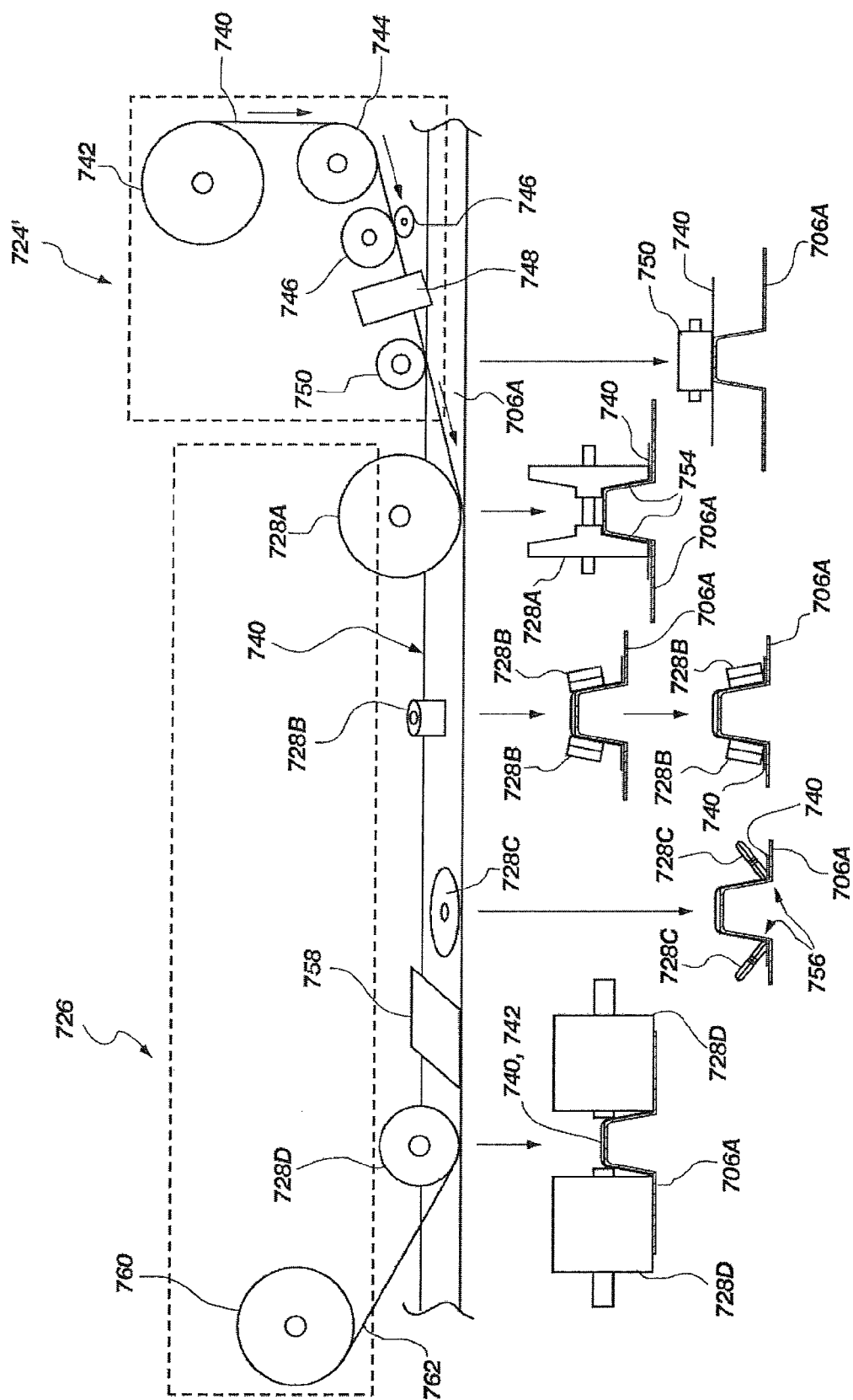
FIG. 15A shows a schematic of an exemplary process carried out by the system and apparatus shown in FIGS. 14A and 14B.

For example, referring to the schematic shown in FIG. 15A, an exemplary operation of the material dispensing device 724 and the forming device 726 is shown. Material 740 (e.g., a ply of prepreg cloth) is fed from a supply and tension roller 742 and over a redirect roller 744 as motivated by a pair of feed rollers 746. The material 740 passes beyond a cutting device 748 which may be used to cut the material to a specified length, width, or both such as described hereinabove with respect to other embodiments of the present invention. The material 740 is then disposed onto a portion of a mandrel 706A by a tack roller 750.

It is noted that the tack roller 750 (and subsequent rollers encountered by the material 740) is shown in a first elevational view with a second, rotated elevational view depicted immediately therebeneath to provide additional understanding of how the material 740 is being shaped by the interaction of various rollers with the material 740 and the underlying mandrel 706A.

The forming device 726 includes a plurality of rollers 728A-728D used to shape and debulk material 740 disposed over the mandrel 706A (or over previously shaped material plies disposed on the mandrel 706A). Thus, for example, a first roller 728A engages the mandrel 706A to generally conform the material 740 to the shape of the mandrel 706A. Second, a set of rollers 728B may be used to press the material against the side walls 754 of the mandrel 706A. If desired, this may be accomplished with multiple sets of rollers 728B working from the upper portion of the mandrel 706A to the bottom portion as depicted in the rotated elevational views of the rollers 728B. Another set of rollers 728C may be used to press the material 740 into the interior lower corners 756 of the mandrel 706A. A squeegee 758 may be used to help pull wrinkles from the material at one or more intermediate locations among the rollers 728A-728D. Finally a set of rollers 728D may be used to press and form the flange members of the elongated member 702.

It is noted that the process of forming the elongated member 702 includes forming, shaping and debulking the material 740 from the inside out. In other words, the tack roller 750 applies pressure to the mandrel 706A and material 740 disposed thereon at the center, with subsequent rollers 728A-728D each sequentially applying pressure at a location further towards the outer edges of the material 740. Such a process has been determined to be efficient and effective in removing wrinkles and air gaps between laminar plies of material thereby producing a highly consolidated and debulked composite member.

A take-up roller 760 may be associated with the forming device 726 (or independently coupled with the carriage assembly 710) to collect carrier material 762 (also referred to as backing) which may be disposed on a surface of, for example, a prepreg material used to form the elongated member 702. The carrier material 762, which may include a suitable polymer material, not only keeps the prepreg material from adhering to itself when in rolled form (i.e., such as when on supply and tension roller 742) but also may remain on the material 740 while the material 740 is being shaped, formed and debulked so that the various rollers 750 and 728A-728D do not stick to the material 740 or collect and build-up resin of a surface thereof. Additionally, the presence of such carrier material 762 may serve to protect the material 740 used to form an elongated member 702 when the various rollers 728 press and rub against the material 740 during forming of the elongated member 702.

Figure 15B:
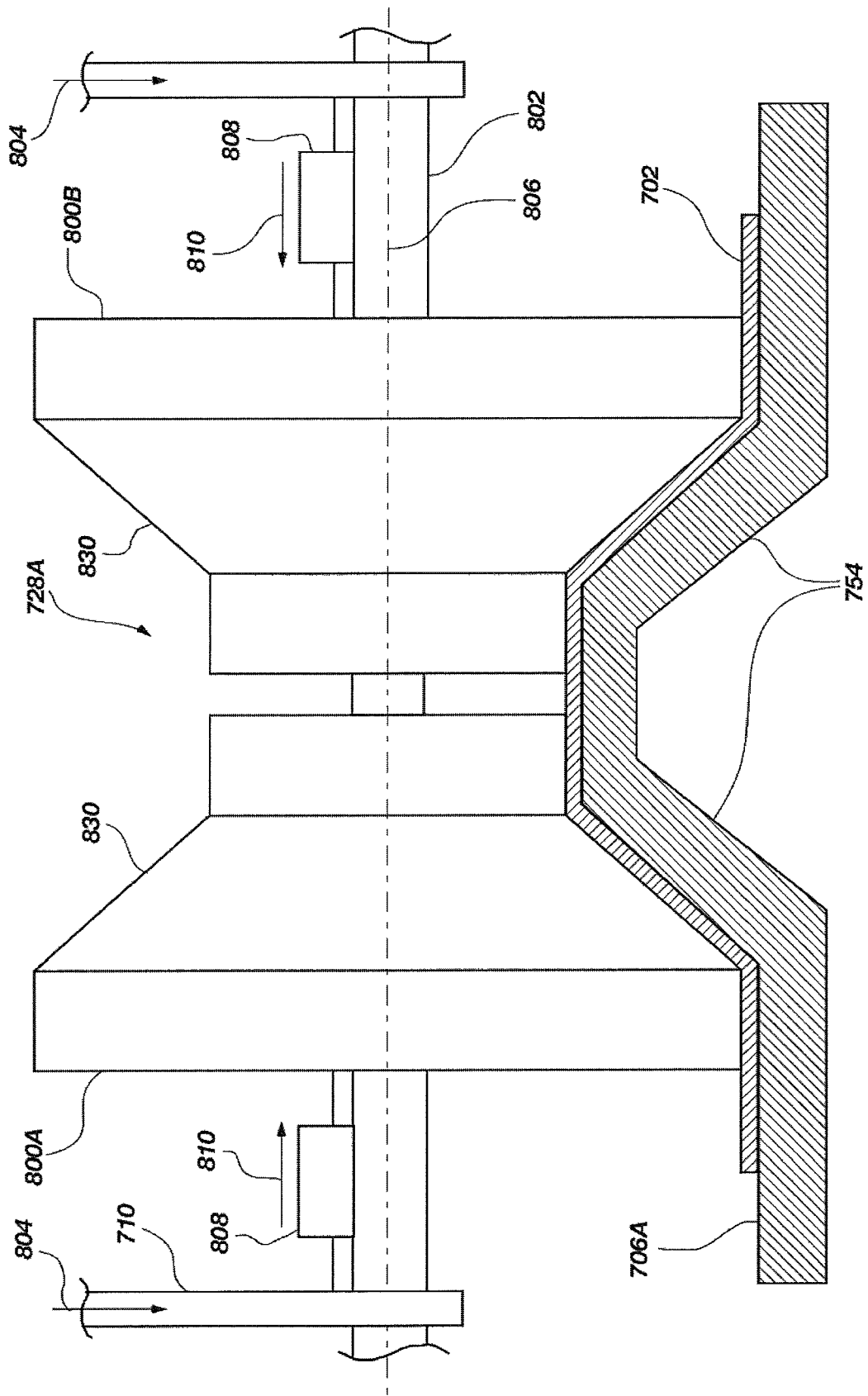

Referring now to FIG. 15B, additional details are shown of the first roller 728A, which may also be described as a scrub roller. It is noted that while the first roller 728A of the presently described embodiment is described as a scrub roller, other or additional rollers (e.g., 728B-728D) may be configured as scrub rollers if so desired.

The scrub roller 728A may include two roller halves 800A and 800B coupled to a shaft 802. The shaft 802 may be coupled to the carriage assembly 710 and an actuator or other force applying mechanism (not shown in FIG. 15B) may be configured to press the scrub roller 728A onto the mandrel 706A as indicated by the directional arrows 804. The two roller halves 800A and 800B are configured to be axially displaced along the shaft 802 (i.e., along the axis 806 of the shaft 802). An actuator or force applying mechanism 808 is associated with each roller half 800A and 800B and configured to bias each roller half 800A and 800B towards the sides of side walls 754 of the mandrel 706A as indicated by the directional arrows 810. The force applying mechanism 808 may include, for example, a spring, a hydraulic actuator or a pneumatic actuator.

Besides the ability to tailor the amount of force being applied to the side walls 754 of the mandrel 706A, the configuration of the scrub roller 728A also enables the production of elongated members 702 that exhibit varied cross-sectional geometries. For example, referring briefly to FIG. 15C, an elongated member 702" may exhibit a varying cross sectional geometry such that the top surface, or cap 813, becomes wider as one traverses along a longitudinal axis 811 of the elongated member 702". Such an elongated member 702" might be used, for example, as a wing spar in the construction of the wing of an aircraft.

As seen in FIG. 15C, the two roller halves 800A and 800B are in a first axial position relative to the shaft 802 when the scrub roller 728A is at a first longitudinal position 812 with respect to the elongated member 702". However, the two rollers halves 800A and 800B are displaced to a second axial position relative to the shaft 802 when the scrub roller 728A is at a second longitudinal position 814 with respect to the elongated member 702" (the scrub roller 728A being shown in dashed lines at the second longitudinal position 814). The configuration of the scrub roller 728A enables the two roller halves 800A and 800B to maintain contact with the side walls of elongated member 702" (and underlying mandrel) and maintain a desired amount of force thereagainst regardless of the change in cross-sectional geometry (e.g., the change in width of the cap 813).

Referring now to FIG. 15D, a schematic shows further detail of the interaction of the scrub roller 728A with the mandrel 706A (or, more particularly, with material 740 disposed over the mandrel 706A). As the scrub roller 728A travels relative to the mandrel 706A in the direction indicated by the directional arrow 820, a roller half 800A (shown in dashed lines for clarity) rotates about an axis 806 in the direction indicated by directional arrow 822. The roller half 800A may be shaped, contoured and positioned such that contact between the material 740 and the mandrel 706A, as effected by the force of the scrub roller 728A, is initiated at a desired location and is limited to a desired surface area. For example, as the roller half 800A rotates, it causes the material 740 to be initially pressed against the surface of the mandrel 706A at the pressing location 824. The location of this initial pressing of material 740 against the mandrel 706A, taking in consideration the rotation of the scrub roller 728A, causes the scrub roller 728A to effectively pull the material 740 down onto the mandrel 706A. Moreover, the surface area of contact effected by the scrub roller may be limited to a defined area 826 such as that shown with cross hatching in FIG. 15D. The scrub roller 728A effectively rubs or sweeps against the material 740 in the defined area 826 to more effectively press and shape the material 740 as it is pressed against the mandrel 706A. The limited area of contact effected by the scrub roller also prevents the scrub roller 728A from lifting the material 740 upwards and away from the mandrel 706A as the scrub roller 728A continues to rotate (such as in the area generally indicated at 828).

It is noted that the initial location of pressure or contact between the material 740 and the mandrel 706A effected by the scrub roller 728A may be determined by the shape, contour, and positioning of the scrub roller 728A relative to the mandrel 706A. For example, referring briefly back to FIG. 15B, the surface 830 of each roller half 800A and 800B that contacts the side walls 754 of the mandrel 706A (or the material disposed thereover), may be configured to exhibit a substantially linear surface (as shown in plan view) or may exhibit a curved or arcuate convex surface to further control the area and location of contact and pressure effected by the scrub roller 728A. In another exemplary embodiment, depending for example, on the actual cross-sectional geometry of an elongated member 702, the scrub roller 728A may be configured such that each roller half 800A and 800B is coupled to an independent shaft, and each shaft may be canted or angled relative to the shaft axis 806 shown in either FIG. 15B or 15C in order to control the surface area of contact by the scrub roller 728A.

Figure 16A:
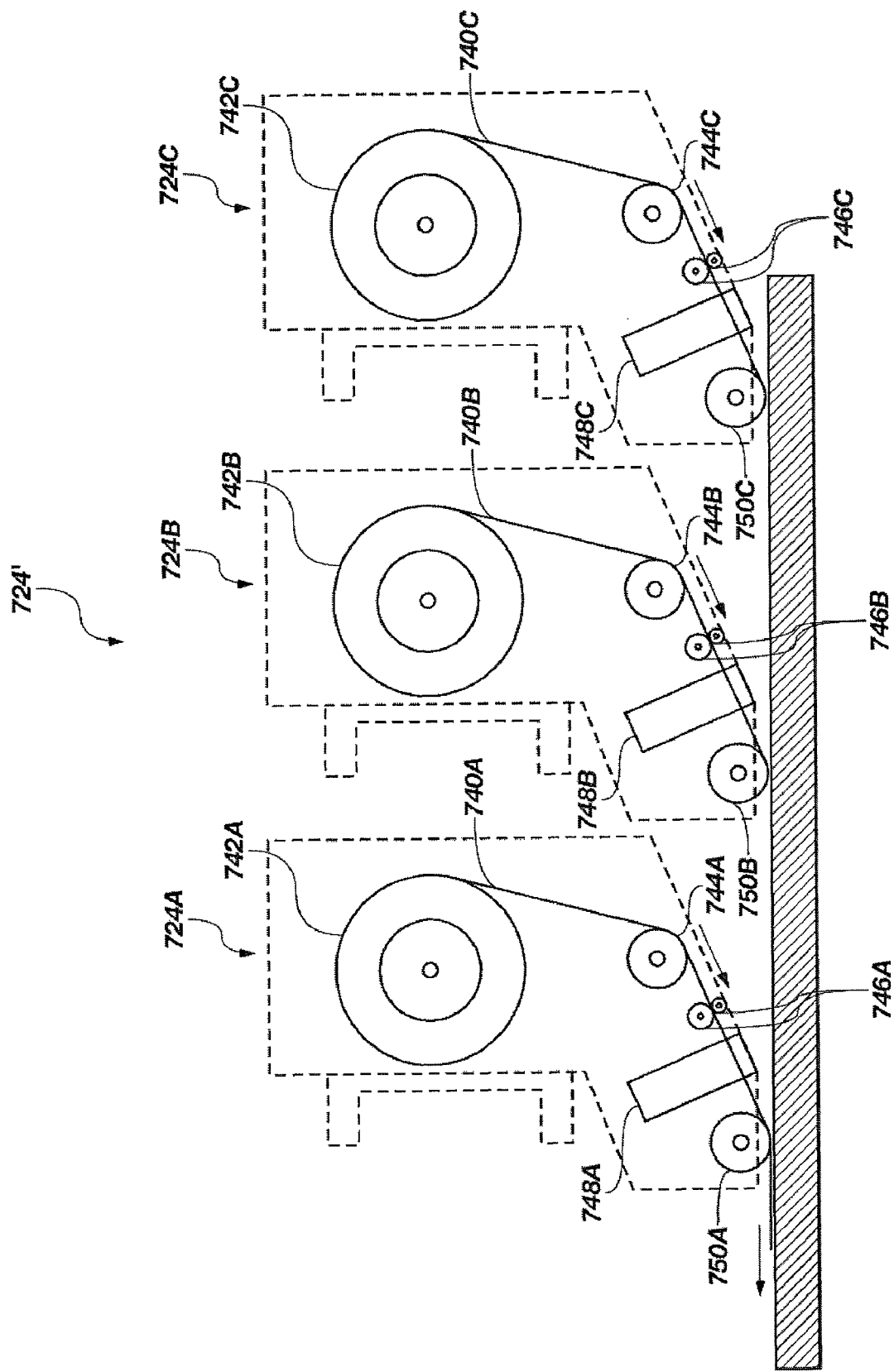
FIGS. 16A and 16B show material dispensing devices which may be used in conjunction with various embodiments of the present invention.

Referring now to FIG. 16A, in one exemplary embodiment, a material dispensing device 724' may include multiple dispensers 724A-724C configured to each selectively dispense an individual ply of material 740A, 740B or 740C onto a mandrel 706A. Each of the dispensers 724A-724C may include a supply and tension roller 742A-742C, a redirect roller 744A-744C, feed rollers 746A-746C, cutting devices 748A-748C and tack rollers 750A-750C.

Each dispenser 724A-724C of the material dispensing device 724' may include a supply of material that exhibits different characteristics than the other supplies of material. For example, the first dispenser 724A may include a ply of material 740A that exhibits a 0° fiber orientation, the second dispenser 724B may include material 740B that exhibits a 45° fiber orientation, and the third dispenser 724C may include material 740C exhibiting a fiber angle different than that included in the first and second dispensers 724A and 724B. In another embodiment, the width or thickness of the material may vary from one dispenser to another. Another exemplary embodiment may include different types of grades of material in each dispenser 724A-724C. Such a configuration provides considerable flexibility and efficiency in the formation of elongated members 702 that are complex assemblies of numerous and varying material plies. For example, if, as shown in FIG. 15A, only a single material dispensing device 724 is used, material 740 may have to be changed frequently on the supply and tension roller 742 in order to accommodate material 740 having different fiber orientations or other varying characteristics.

Figure 16B:
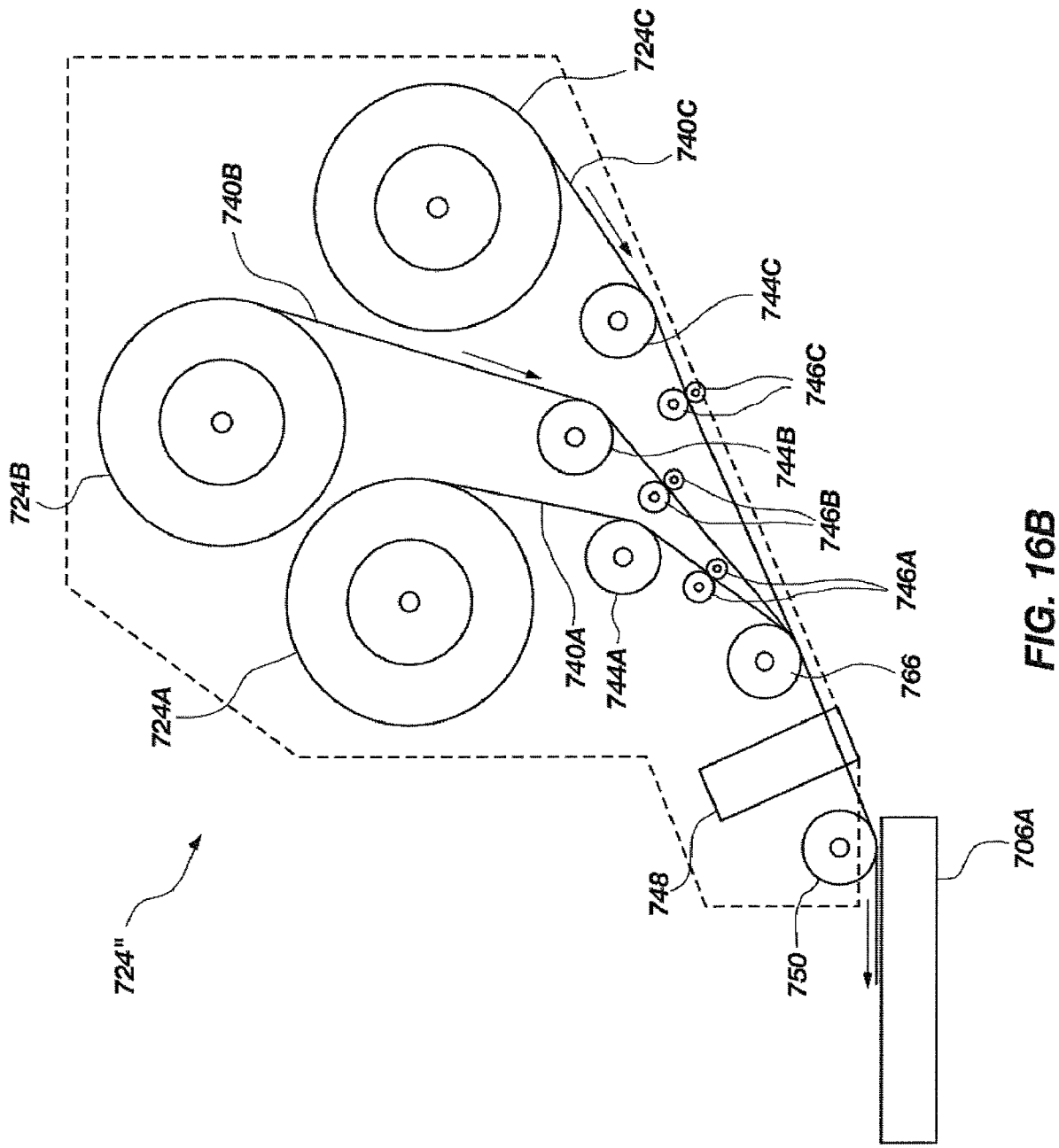

Referring briefly to FIG. 16B, another embodiment of a material dispensing device 724" is shown that includes a plurality of supply and tension rollers 742A-742C, each dispensing a ply of material 740A-740C which passes around associated redirect rollers 744A-744C as motivated by associated feed rollers 746A-746C. After the feed rollers 746A-746B, each of the plies of material 740A-740C may be selectively passed over a common redirect roller 768, through a common cutting device 748 and laid upon a mandrel 706A with assistance of a common tack roller 750. Thus, through independent control of the feed rollers 746A-746C, the plies of material 740A-740C may be individually and selectively fed through the cutting device 748 and to the tack roller 750 to be laid up on a mandrel. As with the embodiment described with respect to FIG. 16A, each ply of material 740A-740C may exhibit a different characteristic than the others, whether it be fiber orientation, material dimensions, material composition, or some other characteristic.

In other embodiments, the material dispensing device 724" may be configured to dispense filler materials such as, for example, filler adhesives or small filler members known by those of ordinary skill in the art as "noodles." Such filler material may be utilized, for example, if an apparatus was configured to join two elongated structures formed as C-shapes in a back-to-back arrangement in order to form an I-beam. As recognized by those of ordinary skill in the art, such a construction often leaves a small recess along the edge of the joint line between the two members which is desirably filled with, for example, a noodle.

Similarly, the material dispensing device may be configured to lay down other materials including, for example, tackifier materials or bagging materials. Tackifier materials may be disposed on individual plies of the material 740 to enhance tack between adjacent plies. Bagging materials may be disposed over a mandrel 706A prior to dispensing a ply of material 740 for subsequent release of an elongated member 702 from the mandrel 706A. Thus, in some instances, it may be desirable to apply a new layer of bagging material over the mandrel prior to manufacturing a new elongated member 702.

Figure 17A:
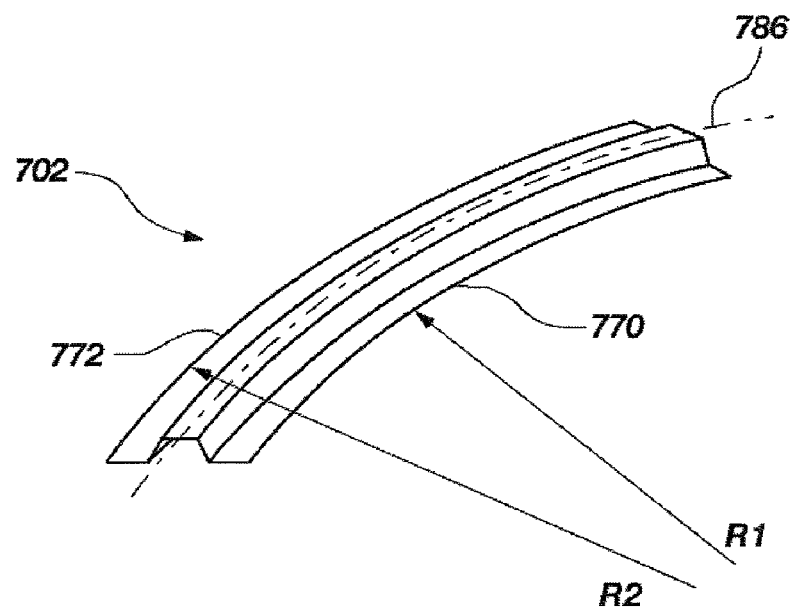
FIGS. 17A and 17B show perspective views of exemplary elongated members formed using the systems and apparatuses shown and described with respect to FIGS. 14A, 14B, 16A and 16B.

Referring now to FIG. 17A, an elongated member 702 is shown which may be formed through use of the apparatus described with respect to FIGS. 14A, 14B and 15A-15D. The elongated member 702 is generally curved or arcuate throughout its length. As noted hereinabove, curved or arcuate elongated member 702 need not exhibit a constant radius throughout its arc length. Indeed, the present invention contemplates the fabrication of elongated members 702 exhibiting multiple curves and various complex geometries. Still referring to FIG. 17A, the elongated member is structured such that it exhibits a first radius of curvature R1 along a first edge 770 of the elongated member 702 and a second radius of curvature R2 along a second edge 772 of the elongated member 702, wherein the second radius of curvature R2 is greater than the first radius of curvature R1. Such a configuration poses a particular problem in manufacturing the elongated member 702 since the material plies (e.g., material 740 in FIG. 15A) being dispensed from a supply and tension roller 742 exhibit generally straight edges down each side thereof. Thus, as the material 740 is placed on a curved mandrel 706A it tends to pucker or wrinkle along the first edge 770 or, more particularly, the edge that exhibits the smaller radius of curvature.

Figure 18:
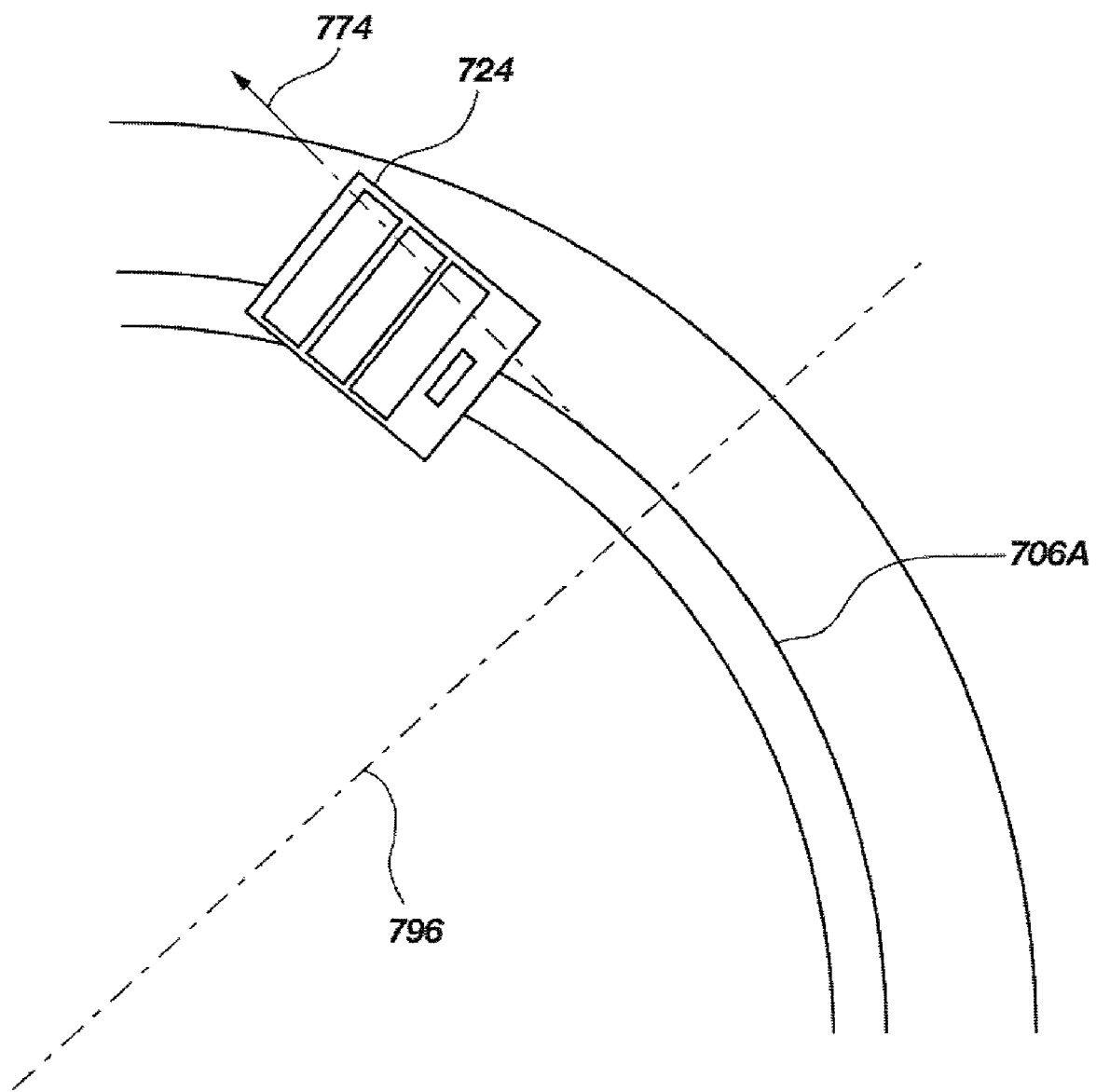
FIG. 18 shows an enlarged partial plan view of the apparatus shown in FIG. 14A.

To prevent wrinkling of the material 740 (FIG. 15A) a desired amount of tension may be applied to the material 740 as it is being applied to the mandrel 706A (FIG. 15A). Thus, for example, referring to FIG. 18 in conjunction with FIGS. 15 and 17A, the material dispensing device 724 may be configured to apply tension to the material 740 in a direction that is tangential to, or at a slight angle deviating from tangent with regard to the mandrel 706A at the point where the material 740 is being placed thereon. For example, considering the tangent line being 90° relative to a radial centerline 796 of the mandrel 706A, in one embodiment, tension may be applied (as indicated by directional arrow 774) at an angle of between approximately 89° and 91° relative to the radial centerline 796. Such tension may be applied, for example, by restricting or otherwise controlling rotation of the supply and tension roller 742 (FIG. 15A) as the material 740 is being dispensed therefrom. For example, a magnitude of desired resistance may be imparted to the supply and tension roller 742 as material 740 is supplied therefrom and while the carriage assembly 710 and rotary table 716 move relative to one another, resulting in tension in the dispensed material 740.

Considering the use of a woven prepreg material as the ply of material 740 being dispensed, application of tension to the material 740 as it is disposed on to the mandrel 706A and subsequently shaped by the forming device 726 causes the material 740 to stretch along the larger radius of curvature (e.g., R2 in FIG. 17A) while preventing wrinkles from forming along or adjacent the smaller curvature of radius (e.g., R1 in FIG. 17A).

In other words, a tension gradient may be developed across the width of the material 740 as it is dispensed and formed on the mandrel 706A. For example, a tension gradient may be developed in the material 740 used to form the elongated member 702 such that tension is at a minimum (which may be nearly zero in some cases) at the lateral edge exhibiting the smaller radius of curvature (e.g., R1) while tension is at a maximum at the lateral edge of the material exhibiting the larger radius of curvature (e.g., R2). The gradient need not be strictly a linear gradient from one edge of the material 740 to the other. The weave of the material 740 may determine, in part, the amount of stretching that may be accommodated by the fabric and the magnitude of the force that needs to be applied to the fabric depending on the "give" of the material as determined by the particular weave of the fabric.

In one exemplary embodiment, a force of approximately 30 to 40 lbf (approximately 133.4 to 177.9 N) may be applied to the material 740 to place the material in appropriate tension. Of course, the amount of force applied to the material may depend on a number of factors including, for example, the type of material being used (including the weave of the fabric), the width of the material, the radius of curvature of the mandrel 706A, or a combination of such factors. In addition to the tension applied to the material 740, heat may be applied to the material to relax the material and help facilitate the stretching of the material 740 along, or adjacent to, the edge exhibiting the larger radius of curvature. However, the amount and intensity of heat applied to the material 740 may be selected and controlled so as to prevent premature curing of the material 740.

Figure 19A:
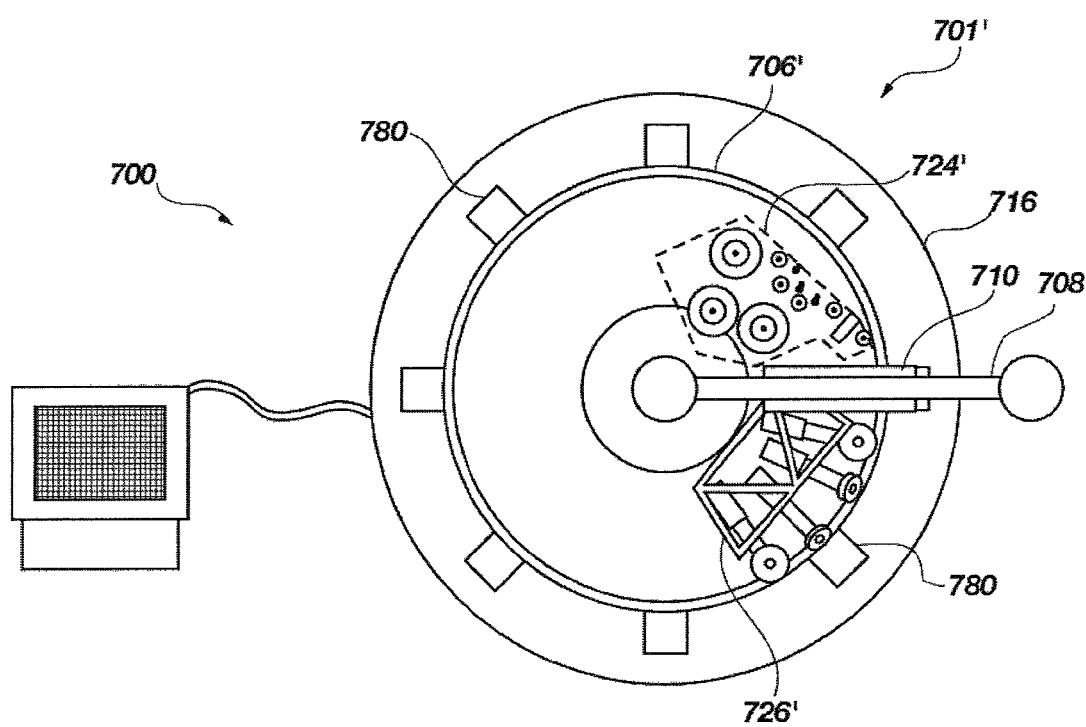
FIGS. 19A and 19B show a plan view and an elevational view, respectively, of a system and apparatus for forming elongated composite members in accordance with yet a further embodiment of the present invention.
Figure 19B:
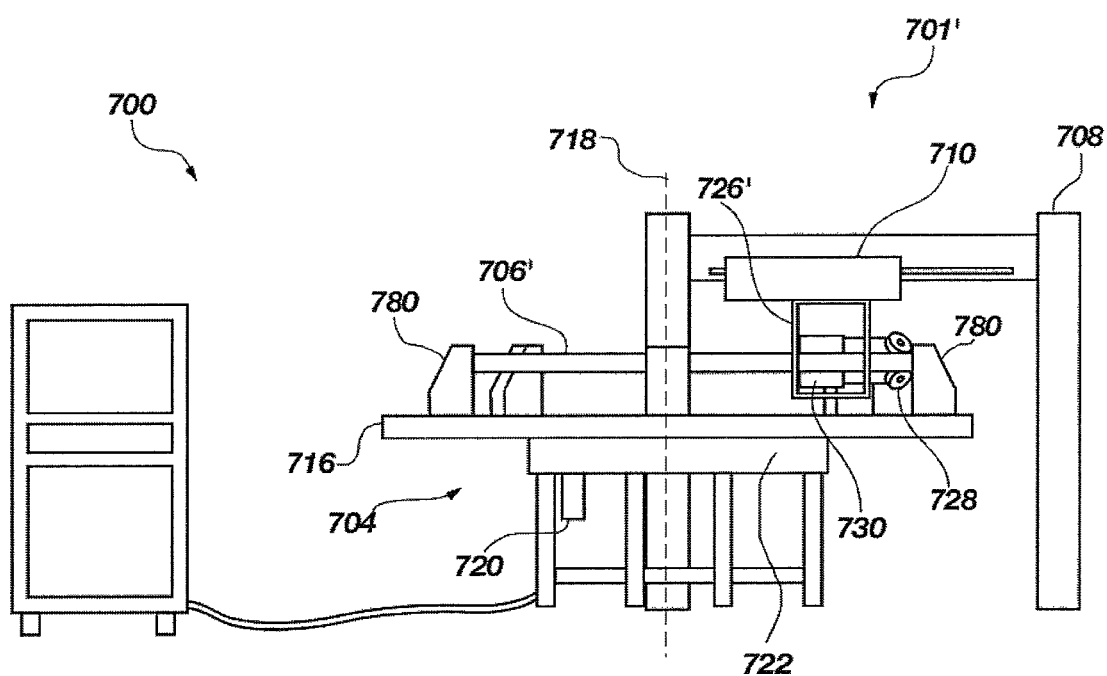

Referring now to FIGS. 19A and 19B, a system 700 including another embodiment of an apparatus 701' for forming curved or arcuate elongated members 702 (FIG. 17B) is shown. The apparatus 701' is similar to that shown and described with respect to FIGS. 14A and 14B with a few modifications. Generally, the apparatus 701' includes a base 704 having a mandrel 706' located thereon. The apparatus 701' further includes a gantry 708 and a carriage assembly 710 movably coupled thereto. The base 704 may include a rotary table 716 configured to rotate about a defined axis 718 relative to the gantry 708 and carriage assembly 710. A motor 720 or other actuator may be operably configured to rotate the rotary table 716 relative to a supporting portion 722 of the base 704.

A material dispensing device 724' and a forming device 726' are coupled with the carriage assembly 710. As the rotary table 716 rotates about the defined axis 718 relative to the gantry 708, the material dispensing device 724' is configured to place one or more plies of material onto the mandrel 706'. The forming device 726' may include a plurality of rollers 728 coupled to actuators 730 and configured to shape the plies of material placed on the mandrel 706'. The mandrel 706' is coupled to the rotary table 716 in a spaced relationship thereto by a plurality of support structures 780. The material dispensing device 724' and the forming device 726' are positioned radially inwardly of the mandrel 706' and configured to engage and interact with the mandrel 706' as it rotates along with the rotary table 716. The configuration and orientation of the material dispensing device 724' and the forming device 726' may be referred to as being parallel to the rotary table 716 whereas the configuration and orientation of the material dispensing device 724' and forming device 726' shown in FIGS. 14A and 14B may be referred to as being normal to the rotary table 716.

Figure 17B:
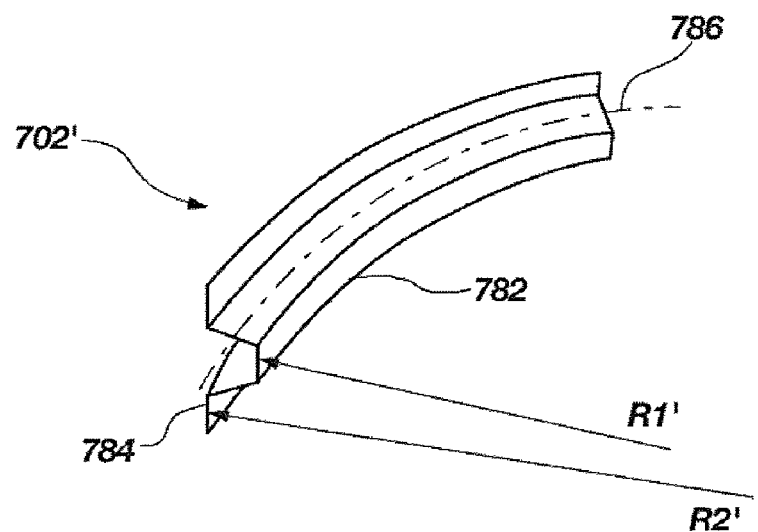

Referring to FIG. 17B, a portion of an exemplary elongated member 702' is shown which may be formed using the apparatus 701' shown and described with respect to FIGS. 19A and 19B. The elongated member 702' is generally arcuate or curved such that a first surface or edge 782 exhibits a first radius of curvature R1', a second edge or surface 784 exhibits a second radius of curvature R2', the second radius of curvature R2' being greater than the first radius of curvature R1'. As with previously described embodiments, a force may be applied to any material disposed on the mandrel 706' to induce a tension gradient and prevent wrinkling of material at or adjacent the smaller radius of curvature (e.g., R1').

It is noted that the cross-sectional geometry of the elongated member 702' is rotated along a general radius of curvature 786 relative to that of the elongated member 702 shown in FIG. 17A. It is again noted that the curved elongated member 702' need not exhibit a constant radius of curvature. The ability to produce elongated members 702 and 702' of such varied configurations enables production of highly customized and complex structures with relative ease and efficiency.

Figure 20:
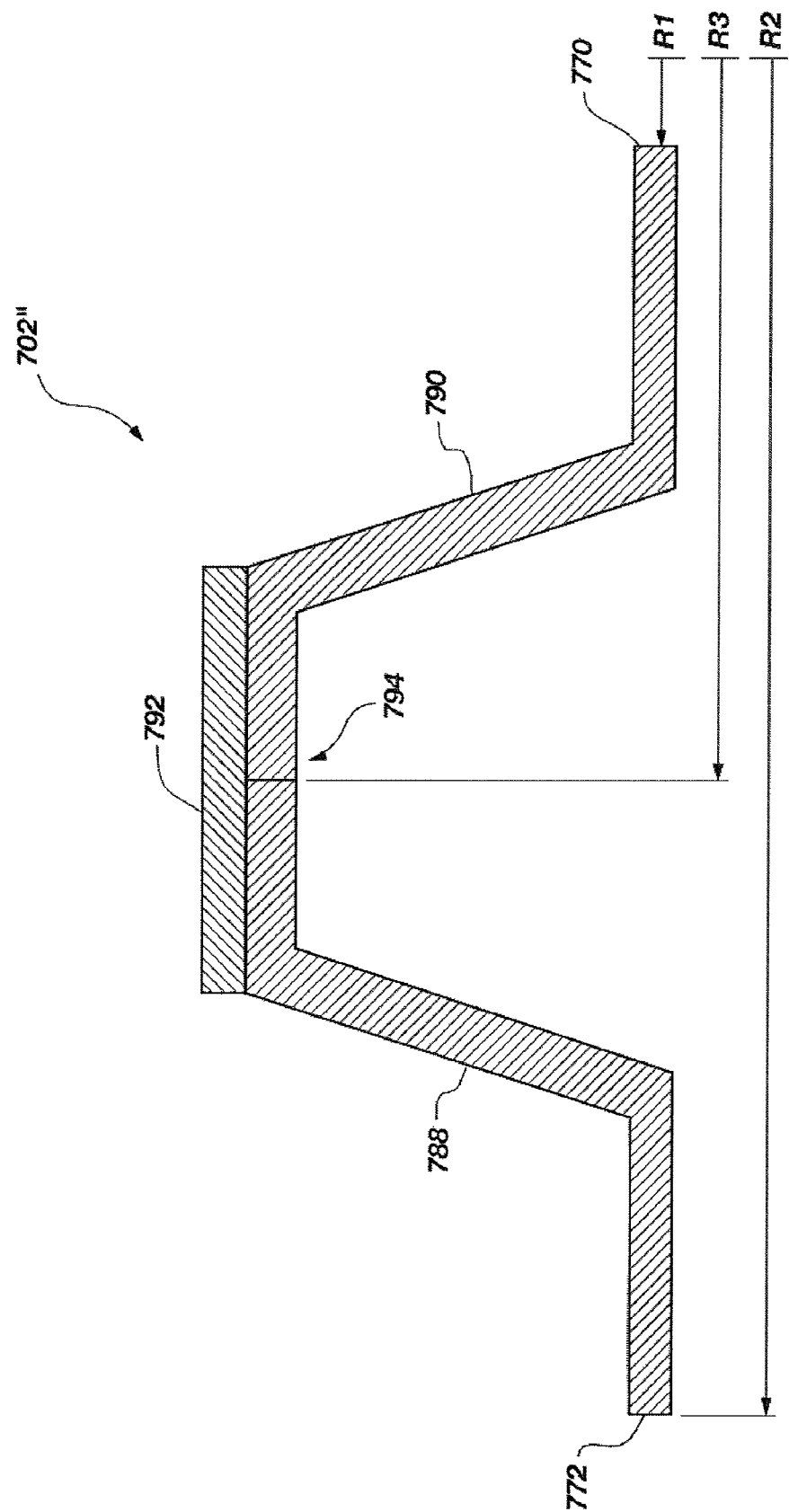
FIG. 20 is a cross-sectional view of an elongated member formed in accordance with a process of the present invention.

Referring now to FIG. 20, a cross-sectional view is shown of an exemplary elongated member 702" formed in accordance with another aspect of the present invention. The elongated member 702" comprises a first material ply 788, which extends from a first edge 770 of the elongated member 702" through about half of the "width" or cross-sectional extent thereof, and a second material ply 790 which abuts the first material ply 788 and extends to the second edge 772 of the elongated member 702". A third ply 792 is disposed on top of the first and second plies 788 and 790 in a laminar manner and forms a bridge over the abutment joint 794 of such plies. Additional plies may be disposed over the first, second and third plies 788, 790 and 792 in a repeating pattern (or in some other defined pattern) if so desired.

The use of multiple adjacent and abutting plies of material reinforced by laminar "bridge" plies provides additional flexibility in forming a curved elongated member 702". For example, if the radius of curvature of the elongated member 702" is such that use of a single ply of material to form the entire cross-sectional geometry would not be feasible, either because wrinkles would still develop or because the amount of tension required to avoid wrinkles would be detrimental to the strength characteristics of the material, separate plies of narrower width may be used. In other words, the tension required to stretch a material ply that is wide enough to extend between the first radius of curvature R1 and the second radius of curvature R2 is greater than that required to stretch a material ply that is wide enough to extend between, for example, the second radius of curvature R2 and a third radius of curvature R3. Thus, using multiple laterally adjacent plies of material enables the construction of elongated members 702" exhibiting "wider" cross-sectional geometries while reducing the tension applied to, and the stretching experienced by, the material plies.

It is noted that other variations of the present invention are also contemplated. For example, while the exemplary embodiments have been described to include a mandrel and a plurality of complementary rollers, two sets of complementary rollers—an upper set, and a lower set—may be used to form the elongated members. Thus, for example, a plurality of fibers may be passed through an upper female set of rollers and a lower male set of rollers to obtain a desired cross-sectional geometry. However, it is noted that the use of a mandrel, such as in the above described exemplary embodiments, may provide more precise placement of the plies and control of fiber orientation. Additionally, while various embodiments have been described in terms of utilizing carriage assemblies and gantries, it is further contemplated that robotic arms may be utilized in positioning the rollers and applying appropriate force or pressure to materials disposed over a mandrel. Such a robot may be configured such that the associated roller or rollers are positionable about multiple axes.

Additionally, various materials may be used in forming the elongated structural members. For example, composite tape, fabric, dry fabric or various combinations thereof may be used. Furthermore, filler materials may be introduced into the elongated structural member as deemed appropriate. Such filler materials may include, for example, foam, metallic or other nonplastic materials.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming a curved composite structure, the method comprising:
    contacting at least one ply of preimpregnated material on a first surface of an elongated mandrel, the first surface of the mandrel having a first radius of curvature along a length of the elongated mandrel, the mandrel further having at least one second surface having a second radius of curvature along the length of the elongated mandrel;
    introducing a tension gradient on the ply adjacent to the first radius of curvature; and
    pressing the ply over the curved mandrel to form the curved composite structure.

2. The method of claim 1, wherein the first radius of curvature is less than the second radius of curvature.

3. The method of claim 1, wherein the at least one ply of preimpregnated material has an orientation based on anticipated loading and stresses on the elongated member.

4. The method of claim 3, wherein the at least one ply of preimpregnated material is a plurality of plies of preimpregnated material, at least one ply of the plurality of plies having a different fiber orientation than another ply of the plurality of the plies.

5. The method of claim 1, wherein the curved mandrel has a varied cross-sectional geometry.

6. The method of claim 5, wherein the cross-sectional geometry varies in width.

7. A method of forming a curved composite structure, the method comprising:
    contacting at least one ply of preimpregnated material on a first edge of an elongated mandrel, the first edge of the mandrel having a first radius of curvature along a length of the elongated mandrel, the mandrel further having at least one second edge having a second radius of curvature along the length of the elongated mandrel;
    introducing a tension gradient on the ply adjacent to the first radius of curvature; and
    pressing the ply over the curved mandrel to form the curved composite structure.

8. The method of claim 7, wherein the first radius of curvature is less than the second radius of curvature.

9. The method of claim 7, wherein the at least one ply of preimpregnated material has an orientation based on anticipated loading and stresses on the elongated member.

10. The method of claim 7, wherein the at least one ply of preimpregnated material is a plurality of plies of preimpregnated material, at least one ply of the plurality of plies having a different fiber orientation than another ply of the plurality of the plies.

11. The method of claim 7, wherein the curved mandrel has a varied cross-sectional geometry.

12. The method of claim 11, wherein the cross-sectional geometry varies along a width.

13. The method of claim 7, further comprising:
using at least one squeegee to form the curved composite structure.

* * * * *